United States Patent
Seimiya et al.

(10) Patent No.: US 10,704,678 B2
(45) Date of Patent: Jul. 7, 2020

(54) TRANSMISSION CONTROL DEVICE

(71) Applicant: Hitachi Automotive Systems, Ltd., Hitachinaka-shi, Ibaraki (JP)

(72) Inventors: Masashi Seimiya, Hitachinaka (JP); Yoshiyuki Yoshida, Hitachinaka (JP); Tomoyasu Sakaguchi, Hitachinaka (JP); Takashi Matsuoka, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 35 days.

(21) Appl. No.: 16/089,765

(22) PCT Filed: Jul. 26, 2017

(86) PCT No.: PCT/JP2017/026979
§ 371 (c)(1),
(2) Date: Sep. 28, 2018

(87) PCT Pub. No.: WO2018/042955
PCT Pub. Date: Mar. 8, 2018

(65) Prior Publication Data
US 2019/0107193 A1    Apr. 11, 2019

(30) Foreign Application Priority Data
Sep. 5, 2016    (JP) ................. 2016-172383

(51) Int. Cl.
*F16H 61/02*    (2006.01)
*B60W 30/06*    (2006.01)
(Continued)

(52) U.S. Cl.
CPC ....... *F16H 61/0213* (2013.01); *B60W 10/113* (2013.01); *B60W 30/06* (2013.01);
(Continued)

(58) Field of Classification Search
CPC .................... B60W 10/113; B60W 30/06
See application file for complete search history.

(56) References Cited

U.S. PATENT DOCUMENTS 8,257,225 B2 * 9/2012 Marcigliano ......... B60W 10/02
477/78
10,325,502 B2 * 6/2019 Colella ................. B60W 10/20
(Continued)

FOREIGN PATENT DOCUMENTS

JP       11-208420 A     8/1999
JP    2000-234654 A     8/2000
(Continued)

OTHER PUBLICATIONS

International Search Report (PCT/ISA/210) issued in PCT Application No. PCT/JP2017/026979 dated Nov. 7, 2017 with English translation (three (3) pages).
(Continued)

*Primary Examiner* — Derek D Knight
(74) *Attorney, Agent, or Firm* — Crowell & Moring LLP

(57) ABSTRACT

The present invention proposes a transmission control device capable of shortening a switching time between forward control and reverse control of a transmission. The present invention relates to a transmission control device that controls a transmission, including: a forward power transmission mechanism configured to move a vehicle forward; and a reverse power transmission mechanism configured to reverse the vehicle. Each of the forward power transmission mechanism and the reverse power transmission mechanism includes a driving-side connector and a driven-side connector. The forward power transmission mechanism and the reverse power transmission mechanism are configured to be capable of changing a contact state where the driving-side connector and the driven-side connector are pushed to contact each other, a retracted state where pushing
(Continued)

forces are released to retract the driving-side connector and the driven-side connector, and an intermediate state formed as the intermediate state between the contact state and the retracted state. When the vehicle is controlled based on a previously-generated control content including switching between forward control and reverse control, one of the forward control and the reverse control is performed by controlling one power transmission mechanism between the forward power transmission mechanism and the reverse power transmission mechanism to the contact state while controlling the other power transmission mechanism to the intermediate state.

20 Claims, 20 Drawing Sheets

(51) Int. Cl.
    F16D 25/10      (2006.01)
    F16D 48/02      (2006.01)
    B60W 10/113     (2012.01)
    F16H 61/00      (2006.01)
    F16H 61/688     (2006.01)
    F16H 59/36      (2006.01)
    F16H 59/72      (2006.01)
(52) U.S. Cl.
    CPC ............ F16D 25/10 (2013.01); F16D 48/02 (2013.01); F16H 61/00 (2013.01); F16H 61/688 (2013.01); B60Y 2300/06 (2013.01); F16H 59/36 (2013.01); F16H 59/72 (2013.01); F16H 2059/366 (2013.01); F16H 2312/09 (2013.01)

(56) References Cited

U.S. PATENT DOCUMENTS

| | | | |
|---|---|---|---|
| 2006/0185459 A1* | 8/2006 | Matsumura | F16D 48/064 74/335 |
| 2009/0210121 A1 | 8/2009 | Tokura et al. | |

FOREIGN PATENT DOCUMENTS

| | | |
|---|---|---|
| JP | 2001-295898 A | 10/2001 |
| JP | 2004-347066 A | 12/2004 |
| JP | 2007-40439 A | 2/2007 |
| JP | 2008-213699 A | 9/2008 |
| JP | 2009-192021 A | 8/2009 |
| JP | 2016-142305 A | 8/2016 |

OTHER PUBLICATIONS

Japanese-language Written Opinion (PCT/ISA/237) issued in PCT Application No. PCT/JP2017/026979 dated Nov. 7, 2017 (three (3) pages).

* cited by examiner

TRANSMISSION CONTROL DEVICE

TECHNICAL FIELD

The present invention relates to a control device and a control method for an automatic transmission, and more particular to a control device and a control method suitable for controlling an automatic transmission that has a plurality of frictional engagement elements and switches forward/reverse movement of an automobile by switching among the plurality of frictional engagement elements.

BACKGROUND ART

Recently, an automated manual transmission (hereinafter referred to as "automatic MT") has been developed as a system in which an operation of a clutch which is a friction mechanism and an operation of a synchromesh mechanism which is a meshing mechanism are automated using a gear transmission used in a manual transmission. When shift is started in the automatic MT, the clutch that transmits and interrupts a torque of an engine, which is a drive power source, is released, the synchromesh mechanism is switched, and then, the clutch is fastened again.

Further, a twin-clutch type automatic MT, which is provided with two clutches transmitting an input torque to a transmission and transmits a drive torque alternately by the two clutches, is known according to JP 2000-234654 A and JP 2001-295898 A. In this twin-clutch type automatic MT, when shift is started, a clutch of the next gear is gradually fastened while gradually releasing a clutch that has transmitted the torque before the shift to change the drive torque from a gear ratio before the shift to a gear ratio after the shift, thereby enabling smooth shift by avoiding interruption of the drive torque.

In the above-described twin-clutch type automatic MT, JP 2007-040439 A discloses a method of executing pre-shift to select a forward starting gear and a reverse starting gear, which are selected for starting, prior to range switching during selection of a neutral range in order to secure a high starting response of a vehicle with respect to a starting selection operation at the time of starting by switching from the N range to a forward range or a reverse range.

Further, a parking assistance device, which automatically guides a host vehicle to a target parking position designated by a driver, is known according to JP 11-208420 A. The parking assistance device is configured to automatically guide the host vehicle to the target parking position regardless of a driving technique of the driver by a simple button operation or screen operation performed by the driver, and provides an easier parking interface to the driver.

CITATION LIST

Patent Literature

PTL 1: JP 2000-234654 A
PTL 2: JP 2001-295898 A
PTL 3: JP 2007-040439 A
PTL 4: JP 11-208420 A

SUMMARY OF INVENTION

Technical Problem

The control described in JP 2007-040439 A is control to secure the starting response of the vehicle with respect to the starting selection operation by fastening both of the forward starting gear and the reverse starting gear in advance during selection of the N range and performing only an operation of fastening a clutch at the time of switching from the N range to a driving range.

However, the clutch is generally constituted by a driving-side connector connected to a drive power source and a driven-side connector connected to a wheel shaft side, and there is a predetermined clearance (dead zone) between the driving-side connector and the driven-side connector. Thus, there is a possibility that it is difficult to transmit a drive force and the starting response deteriorates until the clearance disappears due to movement of any one of the driving-side connector and the driven-side connector.

In particular, since the host vehicle is guided automatically to the target parking position designated by the driver in the vehicle provided with the parking assistance device, and thus, there is a case where forward/reverse control are frequently switched regardless of the range. At that time, there is a possibility that sluggishness may occur in the forward/reverse control switching during execution of parking assistance due to the switching of gears and the clearance of the clutch.

An object of the present invention is to propose a transmission control device capable of shortening a switching time between forward control and reverse control of a transmission.

Solution to Problem

In order to achieve the above object, the present invention relates to a transmission control device that controls a transmission, including: a forward power transmission mechanism configured to move a vehicle forward; and a reverse power transmission mechanism configured to reverse the vehicle. Each of the forward power transmission mechanism and the reverse power transmission mechanism includes a driving-side connector and a driven-side connector. The forward power transmission mechanism and the reverse power transmission mechanism are configured to be capable of changing a contact state where the driving-side connector and the driven-side connector are pushed to contact each other, a retracted state where pushing forces are released to retract the driving-side connector and the driven-side connector, and an intermediate state formed as the intermediate state between the contact state and the retracted state. When the vehicle is controlled based on a previously-generated control content including switching between forward control and reverse control, one of the forward control and the reverse control is performed by controlling one power transmission mechanism between the forward power transmission mechanism and the reverse power transmission mechanism to the contact state while controlling the other power transmission mechanism to the intermediate state.

ADVANTAGEOUS EFFECTS OF INVENTION

According to the present invention, it is possible to shorten the switching time between forward control and reverse control of the transmission.

DESCRIPTION OF EMBODIMENTS

Hereinafter, embodiments of the present invention will be described in detail with reference to FIGS. 1 to 25.

First, a configuration example of a control device for an automobile having an automatic transmission according to the present invention will be described with reference to FIG. 1.

Figure 1:
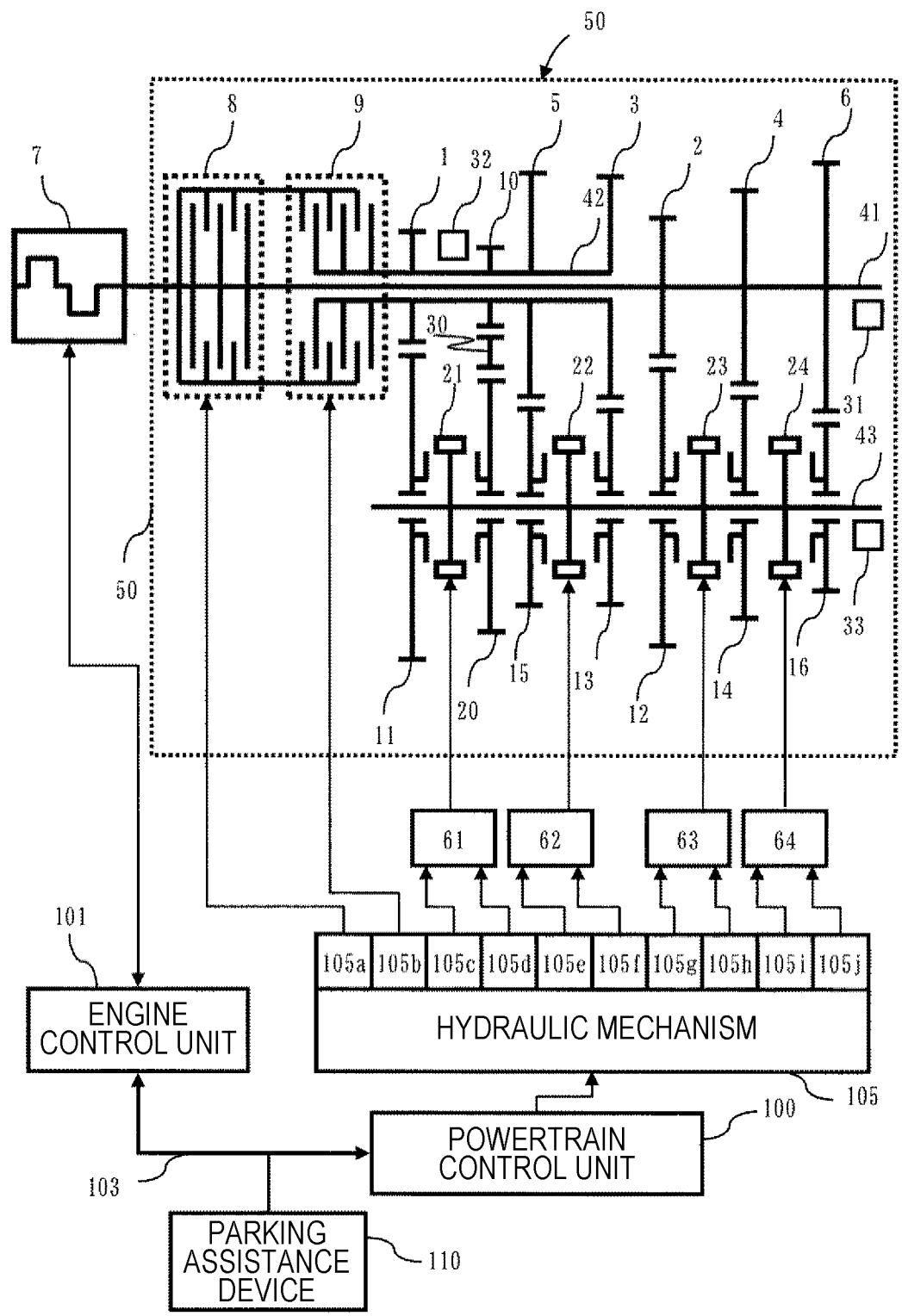
FIG. 1 is a skeleton diagram illustrating a configuration of a control device for an automatic transmission according to an embodiment of the present invention.

FIG. 1 is a skeleton diagram of a system configuration example illustrating an embodiment of the control device for the automobile provided with the automatic transmission according to the present invention.

An engine 7 as a drive power source, an engine rotation speed sensor (not illustrated) that measures rotation speed of the engine 7, an electronically controlled throttle (not illustrated) that adjusts an engine torque, and a fuel injection device (not illustrated) configured to inject a fuel amount corresponding to an intake air amount are provided, and it is possible to control the torque of the engine 7 with high accuracy by controlling the intake air amount, the fuel amount, an ignition timing, or the like by an engine control unit 101. An intake port injection system in which fuel is injected into an intake port or an in-cylinder injection system in which fuel is directly injected into a cylinder is exemplified as the fuel injection device. It is advantageous to use an engine of a system that exhibits good exhaust performance and capable of reducing fuel consumption by comparing operation ranges (a domain determined by the engine torque and the engine rotation speed) required for the engine. The drive power source may be a diesel engine, a natural gas engine, an electric motor, or the like as well as a gasoline engine.

An automatic transmission 50 is provided with a first clutch 8, a second clutch 9, a first input shaft 41, a second input shaft 42, an output shaft 43, a first drive gear 1, a second drive gear 2, a reverse drive gear 10, a third drive gear 3, a fourth drive gear 5, a fifth drive gear 5, a sixth drive gear 6, a first driven gear 11, a second driven gear 12, a reverse driven gear 20, a third driven gear 13, a fourth driven gear 14, a fifth driven gear 15, a sixth driven gear 16, an idler gear 30, a first synchromesh mechanism 21, a second synchromesh mechanism 22, a third synchromesh mechanism 23, a fourth synchromesh mechanism 24, a rotation sensor 31, a rotation sensor 32, and a rotation sensor 33. It is possible to transmit the torque of the engine 7 to the first input shaft 41 or interrupt the transmission thereof by engaging or disengaging the first clutch 8. Further, it is possible to transmit the torque of the engine 7 to the second input shaft 42 or interrupt the transmission thereof by engaging and disengaging the second clutch 9. In the present embodiment, a wet-type multiple disc clutch is used for the first clutch 8 and the second clutch 9, but a dry-type single disc clutch may be used, and it is possible to use all friction transmission mechanisms. Further, it is also possible to use an electromagnetic powder clutch.

The second input shaft 42 is hollow and the first input shaft 41 is configured to pass through the hollow portion of the second input shaft 42 and to be capable of relative movement in a rotational direction with respect to the second input shaft 42.

The first drive gear 1, the third drive gear 3, the fifth drive gear 5, and the reverse drive gear 10 are fixed to the second input shaft 42, and are rotatable with respect to the first input shaft 41. Further, the second drive gear 2, the fourth drive gear 4, and the sixth drive gear 6 are fixed to the first input shaft 41, and are configured to be capable of relative movement in the rotational direction with respect to the second input shaft 42.

The sensor 31 is provided as a means for detecting rotation speed of the first input shaft 41 and the sensor 32 is provided as a means for detecting rotation speed of the second input shaft 42.

On the other hand, the output shaft 43 is provided with the first driven gear 11, the second driven gear 12, the third driven gear 13, the fourth driven gear 14, the fifth driven gear 15, the sixth driven gear 16, and the reverse driven gear (not illustrated). The first driven gear 11, the second driven gear 12, the third driven gear 13, the fourth driven gear 14, the fifth driven gear 15, the sixth driven gear 16, and the reverse driven gear 20 are provided rotatably with respect to the output shaft 43.

Further, the sensor 33 is provided as a means for detecting rotation speed of the output shaft 43.

Among these gears, the first drive gear 1 is mesh with the first driven gear 11, and the second drive gear 2 is mesh with the second driven gear 12. Further, the third drive gear 3 is mesh with the third driven gear 13, and the fourth drive gear 4 is mesh with the fourth driven gear 14. Further, the fifth drive gear 5 is mesh with the fifth driven gear 15, and the sixth drive gear 6 is mesh with the sixth driven gear 16. Further, the reverse drive gear 10, the idler gear 30, and the reverse driven gear 20 are engaged with each other. Further, the first synchromesh mechanism 21, which engages the first driven gear 11 with the output shaft 43 or engages the reverse driven gear 20 with the output shaft 43, is provided between the first driven gear 11 and the reverse driven gear 20.

Further, the third synchromesh mechanism 23, which engages the second drive gear 12 with the output shaft 43 or engages the fourth driven gear 14 with the output shaft 43, is provided between the second driven gear 12 and the fourth driven gear 14.

Further, the second synchromesh mechanism 22, which engages the fifth driven gear 15 with the output shaft 43 or engages the third driven gear 13 with the output shaft 43, is provided between the fifth driven gear 15 and the third driven gear 13.

Further, the sixth driven gear 16 is provided with the fourth synchromesh mechanism 24 which engages the sixth driven gear 16 with the output shaft 43.

As a powertrain control unit 100 controls each current of a solenoid valve 105c and a solenoid valve 105d provided in a hydraulic mechanism 105, a position or a load of the first synchromesh mechanism 21 is controlled via a hydraulic piston (not illustrated) and a shift fork (not illustrated) provided in a shift actuator 61, and it is possible to transmit a rotational torque of the second input shaft 42 to the output shaft 43 via the first synchromesh mechanism 21 by engaging the first synchromesh mechanism 21 with the first driven gear 11 or the reverse driven gear 20. Here, it is configured such that a load is applied in a direction in which the first synchromesh mechanism 21 moves toward the first driven gear 11 by increasing the current of the solenoid valve 105d, and a load is applied in a direction in which the first synchromesh mechanism 21 moves toward the reverse driven gear 20 by increasing the current of the solenoid valve 105c. Incidentally, the shift actuator 61 is provided with a position sensor 61a (not illustrated) that measures the position of the first synchromesh mechanism 21.

Further, as the powertrain control unit 100 controls each current of a solenoid valve 105e and a solenoid valve 105f provided in the hydraulic mechanism 105, a position or a load of the second synchromesh mechanism 22 is controlled via a hydraulic piston (not illustrated) and a shift fork (not illustrated) provided in a shift actuator 62, and it is possible to transmit the rotational torque of the second input shaft 42 to the output shaft 43 via the second synchromesh mechanism 22 by engaging the second synchromesh mechanism 22 with the fifth driven gear 15 or the third driven gear 13. Incidentally, the shift actuator 62 is provided with a position sensor 62a (not illustrated) that measures a position of the second synchromesh mechanism 22.

Further, as the powertrain control unit 100 controls each current of a solenoid valve 105g and a solenoid valve 105h provided in the hydraulic mechanism 105, a position or a load of the third synchromesh mechanism 23 is controlled via a hydraulic piston (not illustrated) and a shift fork (not illustrated) provided in a shift actuator 63, and it is possible to transmit the rotational torque of the first input shaft 41 to the output shaft 43 via the third synchromesh mechanism 23 by engaging the third synchromesh mechanism 23 with the second driven gear 12 or the fourth driven gear 14. Incidentally, the shift actuator 63 is provided with a position sensor 63a (not illustrated) that measures the position of the third synchromesh mechanism 23.

Further, as the powertrain control unit 100 controls each current of a solenoid valve 105i and a solenoid valve 105j provided in the hydraulic mechanism 105, a position or a load of the fourth synchromesh mechanism 24 is controlled via a hydraulic piston (not illustrated) and a shift fork (not illustrated) provided in a shift actuator 64, and it is possible to transmit the rotational torque of the first input shaft 41 to the output shaft 43 via the fourth synchromesh mechanism 24 by engaging the fourth synchromesh mechanism 24 with the sixth driven gear 16. Incidentally, the shift actuator 64 is provided with a position sensor 64a (not illustrated) that measures the position of the fourth synchromesh mechanism 24.

In this way, the rotational torque of the transmission input shaft 41, which has been transmitted to the transmission output shaft 43 via the first driven gear 11, the second driven gear 12, the third driven gear 13, the fourth driven gear 14, the fifth driven gear 15, the sixth driven gear 16, and the reverse driven gear 20 from the first drive gear 1, the second drive gear 2, the third drive gear 3, the fourth drive gear 4, the fifth drive gear 5, the sixth drive gear 6, and the reverse drive gear 10, is transmitted to an axle (not illustrated) via a differential gear (not illustrated) connected to the transmission output shaft 43.

Further, the current of a solenoid valve 105a provided in the hydraulic mechanism 105 is controlled by the powertrain control unit 100 to control a pressure plate (not illustrated) provided in the first clutch 8, thereby controlling a transmission torque of the first clutch 8.

Further, the current of a solenoid valve 105b provided in the hydraulic mechanism 105 is controlled by the powertrain control unit 100 to control a pressure plate (not illustrated) provided inside the second clutch 9, thereby controlling a transmission torque of the second clutch 9.

A parking assistance control unit 110 is connected to a camera capable of imaging the front, rear, and side of a vehicle, recognizes an external world by image processing, and detects an obstacle around the vehicle, for example. Further, the parking assistance control unit 110 is connected to a display. The display is a multimedia interface that performs display of an image obtained by the camera and notification of various kinds of information to the driver, and receives an instruction of a target parking position from the driver using a touch display. Further, the parking assistance control unit 110 is also connected to an electric power steering, and controls an electric motor to steer the steering during a parking assist operation in order to automatically guide a host vehicle to the target parking position.

The transmission control unit 100, the engine control unit 101, and the parking assistance control unit 110 are configured to be capable of mutually transmitting and receiving information via a communication means 103.

The shift actuator 61 is controlled by the solenoid valve 105*c* and the solenoid valve 105*d*, the first synchromesh mechanism 21 is meshed with the first driven gear 11 to engage the second clutch 9, thereby performing first-gear driving.

The shift actuator 63 is controlled by the solenoid valve 105*g* and the solenoid valve 105*h*, the third synchromesh mechanism 23 is meshed with the second driven gear 12 to engage the first clutch 8, thereby performing second-gear driving.

The shift actuator 62 is controlled by the solenoid valve 105*e* and the solenoid valve 105*f*, the second synchromesh mechanism 22 is meshed with the third driven gear 13 to engage the second clutch 9, thereby performing third-gear driving.

The shift actuator 63 is controlled by the solenoid valve 105*g* and the solenoid valve 105*h*, the third synchromesh mechanism 23 is meshed with the fourth driven gear 14 to engage the first clutch 8, thereby performing fourth-gear driving.

The shift actuator 62 is controlled by the solenoid valve 105*e* and the solenoid valve 105*f*, the second synchromesh mechanism 22 is meshed with the fifth driven gear 15 to engage the second clutch 9, thereby performing fifth-gear driving.

The shift actuator 64 is controlled by the solenoid valve 105*i* and the solenoid valve 105*j*, the fourth synchromesh mechanism 24 is meshed with the sixth driven gear 16 to engage the first clutch 8, thereby performing sixth-gear driving.

The shift actuator 61 is controlled by the solenoid valve 105*c* and the solenoid valve 105*d*, the first synchromesh mechanism 21 is meshed with the reverse driven gear 20 to engage the second clutch 9, thereby performing reverse-gear driving.

Incidentally, the hydraulic mechanism using the solenoid valve and the hydraulic piston is configured in the present embodiment as a mechanism for operating a first meshing transmission mechanism 21, a second meshing transmission mechanism 22, a third meshing transmission mechanism 23, and a fourth meshing transmission mechanism 24. Instead of the solenoid valve and the hydraulic piston, however, it may be configured to use an electric motor and a reduction gear, to use an electric motor and a drum, or to use another mechanism for controlling the meshing transmission mechanisms 21, 22, 23, and 24. Further, when using the electric motor, various motors are applicable as the motor using a so-called DC motor in which a magnet is fixed and a winding is rotated in the case of using the electric motor or a so-called permanent magnet synchronous motor in which a winding is fixed and a magnet is rotated.

Further, the present embodiment is configured as the hydraulic mechanism using the solenoid valve in order to operate the first clutch 8 and the second clutch 9, but it may be configured such that the clutch is operated using an electric motor and a reduction gear or that the pressure plate of the clutch is controlled by an electromagnetic coil, and it may be configured to use another mechanism for controlling the first clutch 8 and the second clutch 9.

Next, details of the clutch 8 and the clutch 9 of FIG. 1 will be described with reference to FIGS. 2 to 5. Incidentally, FIGS. 2 to 5 illustrate the dry-type single disc clutch, but the present invention is also applicable to the wet-type multiple disc clutch.

FIGS. 2 to 5 illustrate explanatory views of a retracted state where a torque is completely disconnected from the drive power source, a contact state capable of transmitting the torque from the drive power source, and an intermediate state between the retracted state and the contact state. When a pressure is applied to a driving-side friction surface 2002 by a hydraulic pressure 2001, the driving-side friction surface 2002 compresses a return spring 2004 and moves in a direction of a main shaft 2007 so as to be capable of contacting a driven-side friction surface 2003.

First, the retracted state will be described with reference to FIG. 2.

Figure 2:
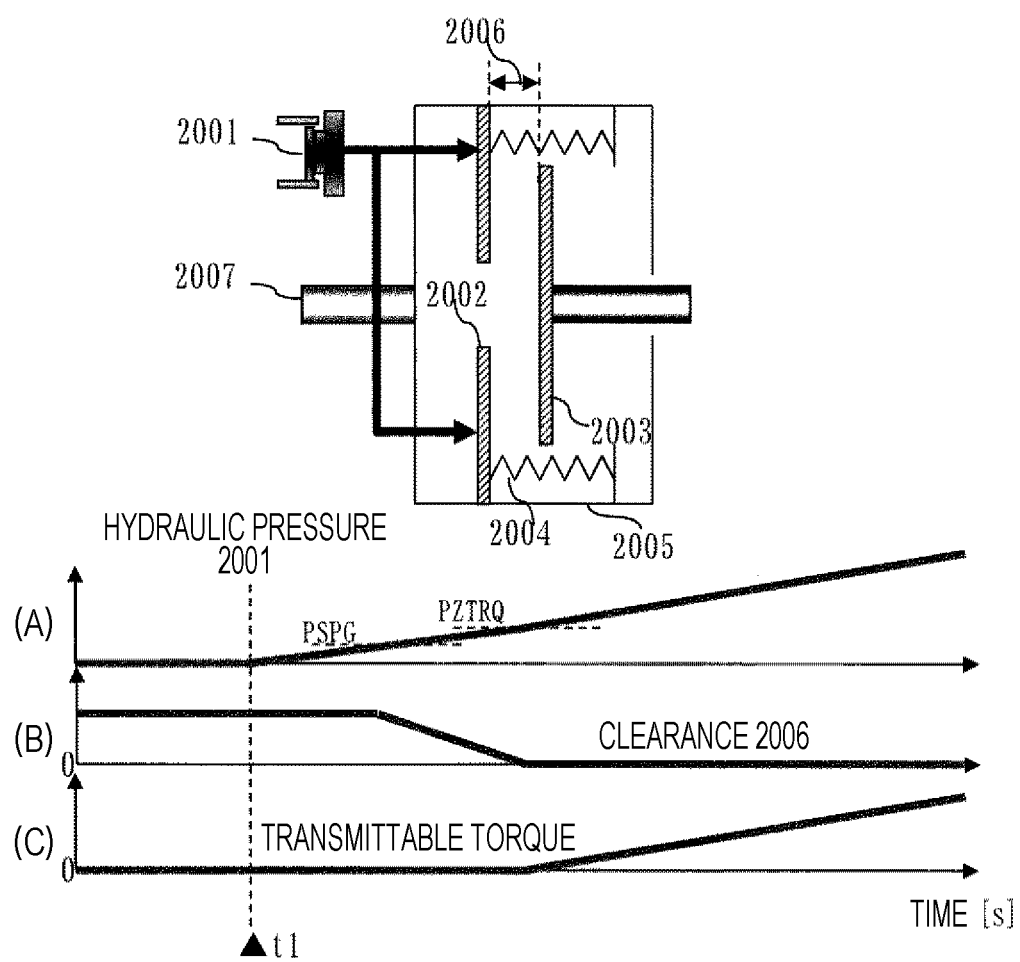
FIG. 2 is a configuration diagram illustrating a clutch retracted state.

The retracted state is a state before a time t1 in FIG. 2, the state where a clearance 2006 between the driving-side friction surface 2002 and the driven-side friction surface 2003 is the largest because the hydraulic pressure 2001 is 0 MPa, and a transmittable torque is 0 Nm. When the hydraulic pressure 2001 starts to increase at the time t1, the retracted state is changed to the intermediate state.

Figure 3:
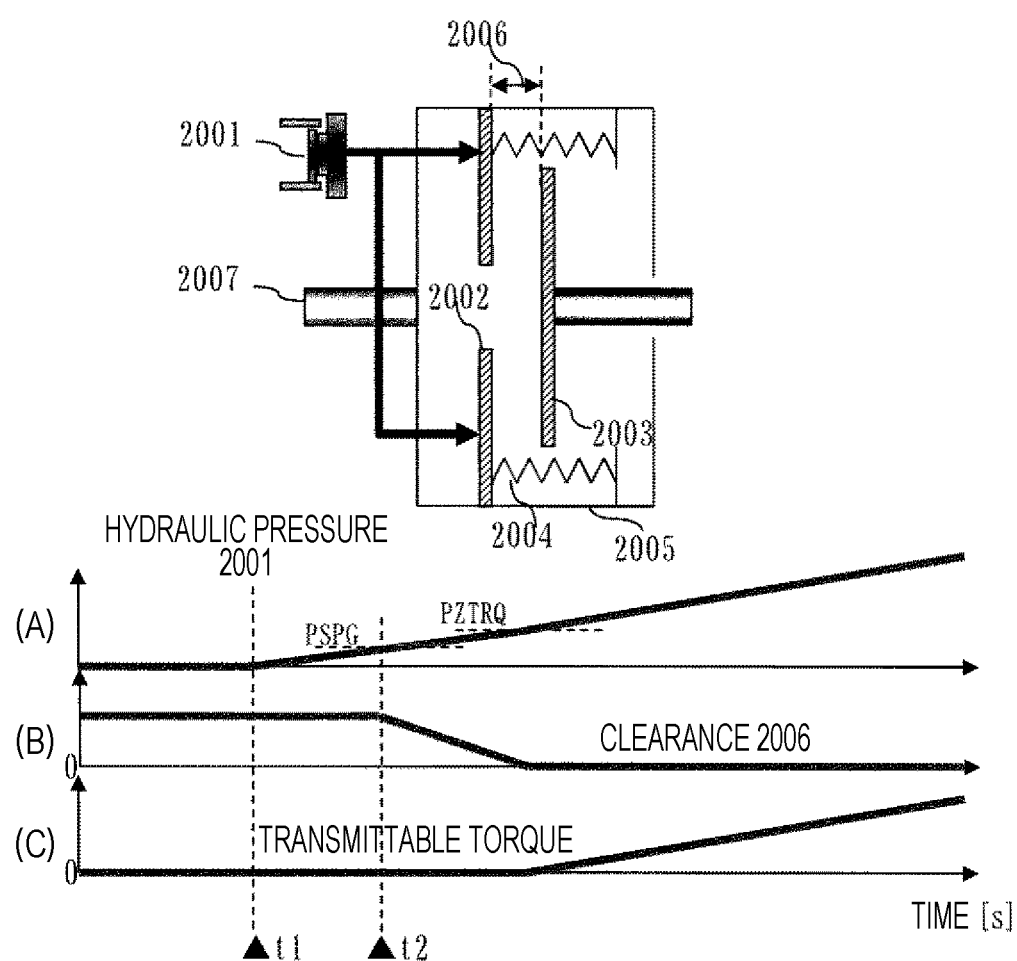
FIG. 3 is a configuration diagram illustrating a clutch intermediate state.

Next, the intermediate state will be described with reference to FIGS. 3 and 4.

From the time t1 to a time t2, the hydraulic pressure is equal to or lower than a set load PSPG of the return spring and the driving-side friction surface 2002 does not move even if the hydraulic pressure 2001 increases, and thus, the clearance 2006 and the transmittable torque are not changed in this state.

Figure 4:
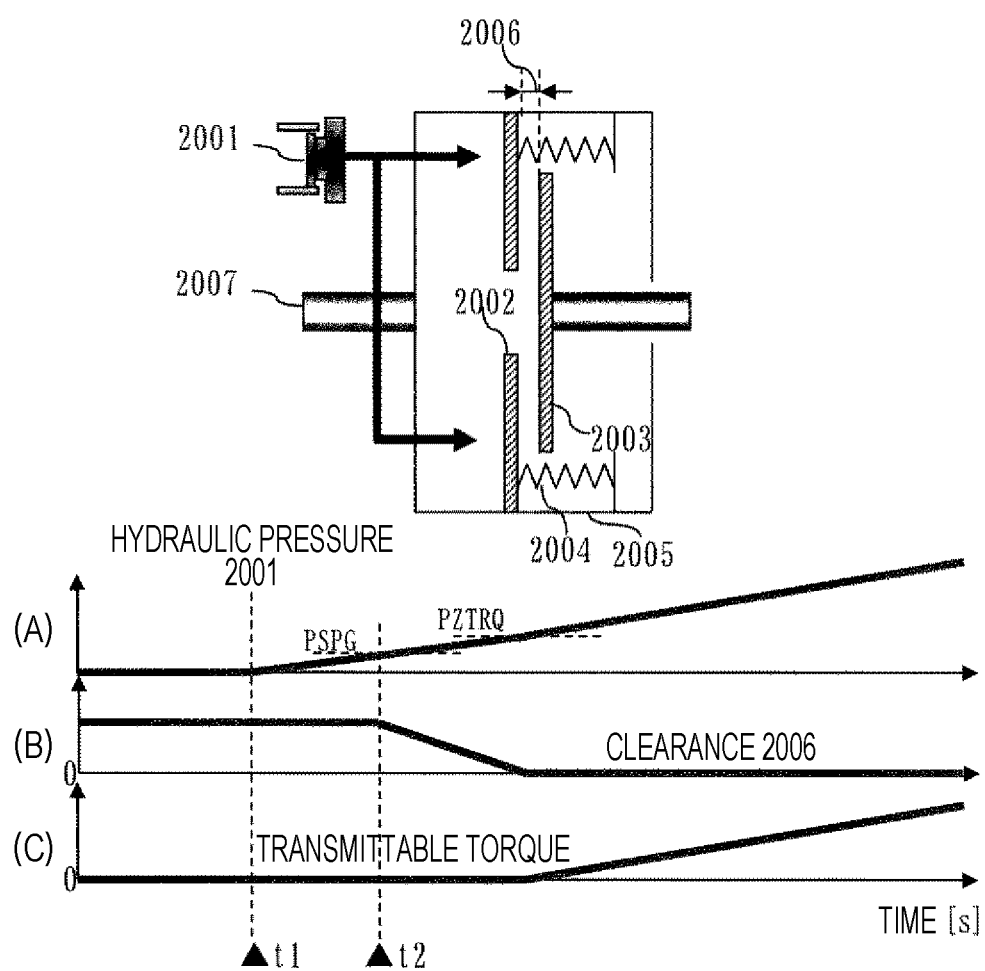
FIG. 4 is a configuration diagram illustrating the clutch intermediate state.

When the hydraulic pressure 2001 becomes equal to or higher than the set load PSPG of the return spring at the time t2, the driving-side friction surface 2002 starts to move in the direction of the main shaft 2007, and the clearance 2006 between the driving-side friction surface 2002 and the driven-side friction surface 2003 starts to decrease as illustrated in FIG. 4. On the other hand, the clearance is present between the driving-side friction surface 2002 and the driven-side friction surface 2003, the transmittable torque remains at 0 Nm. As the hydraulic pressure 2001 increases, the clearance 2006 decreases, and a state at a time t3 in FIG. 5 is formed when the clearance becomes zero.

The intermediate state according to the present embodiment is formed from the time t1 at which the increase of the hydraulic pressure is started to the time t3 at which the clearance 2006 between the driving-side friction surface 2002 and the driven-side friction surface 2003 becomes zero.

Figure 5:
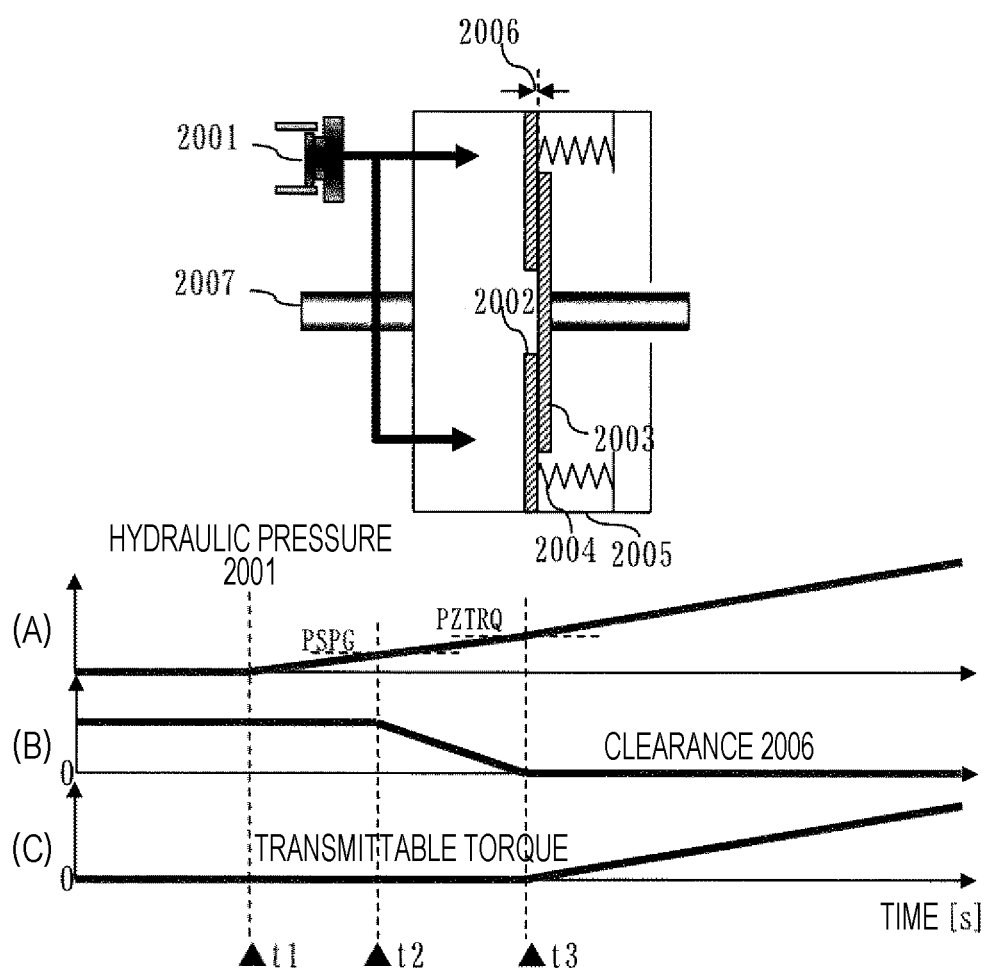
FIG. 5 is a configuration diagram illustrating a clutch contact state.

Further, the contact state is formed after the time t3 in FIG. 5. As the hydraulic pressure 2001 increases, a pushing pressure between the driving-side friction surface 2002 and the driven-side friction surface 2003 increases, and the transmission torque increases.

Figure 6:
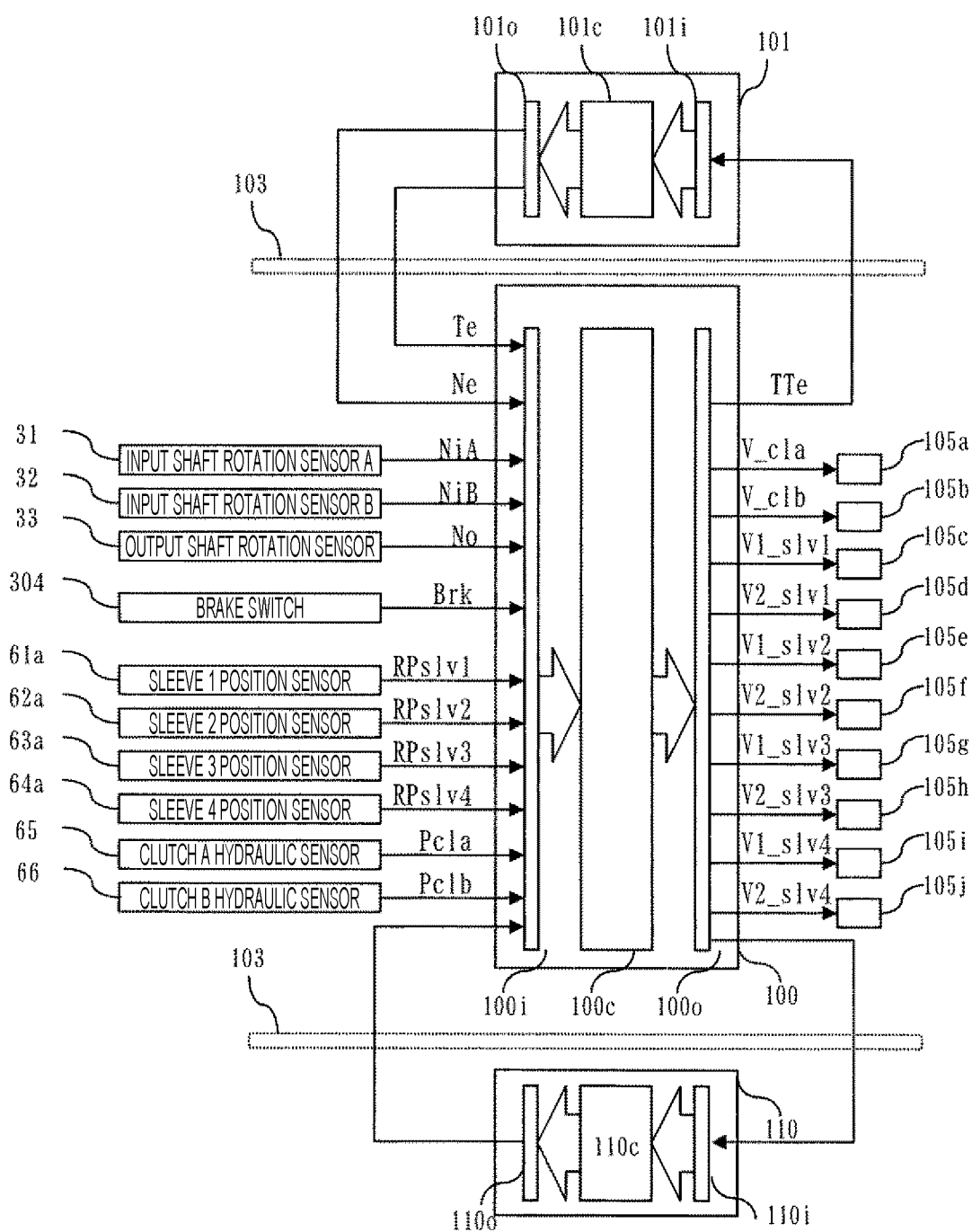
FIG. 6 is a block diagram illustrating a powertrain control unit 100 used in the control device for the automatic transmission according to the embodiment of the present invention, and an input/output signal relationship of an engine control unit 101 and a parking assistance device 110.

FIG. 6 illustrates a relationship of input and output signals among the transmission control unit 100, the engine control unit 101, and the parking assistance device 110. The transmission control unit 100 is configured as a control unit including an input unit 100*i*, an output unit 100*o*, and a computer 100*c*. Similarly, the engine control unit 101 is also configured as a control unit including an input unit 101*i*, an output unit 101*o*, and a computer 101*c*. Similarly, the parking assistance control unit 110 is also configured as a control unit including an input unit 110$i$, an output unit 110$o$, and a computer 110$c$. A engine torque command value TTe is transmitted using the communication means 103 from the transmission control unit 100 to the engine control unit 101, and the engine control unit 101 controls an intake air amount, a fuel amount, an ignition timing, and the like (not illustrated) of the engine 7 so as to realize TTe. Further, a means (not illustrated) for detecting an engine torque, which is an input torque to the transmission, is provided inside the engine control unit 101 so that a rotation speed Ne of the engine 7 and an engine torque Te generated by the engine 7 are detected by the engine control unit 101 and transmitted to the transmission control unit 100 using the communication means 103. A torque sensor is used as the engine torque detection means, or an estimation means using parameters of the engine such as an injection pulse width of an injector, a pressure in an intake pipe, and an engine rotation speed may be used.

In order to realize a desired first clutch transmission torque, the powertrain control unit 100 controls the current of the solenoid valve 105$a$ by adjusting a voltage V_cla to be applied to the solenoid valve 105$a$, thereby engaging and disengaging the first clutch 8.

Further, in order to realize a desired second clutch transmission torque, the powertrain control unit 100 controls the current of the solenoid valve 105$b$ by adjusting a voltage V_clb to be applied to the solenoid valve 105$b$, thereby engaging and disengaging the second clutch 9.

Further, in order to realize a desired position of the first synchromesh mechanism 21, the powertrain control unit 100 controls the currents of the solenoid valves 105$c$ and 105$d$ by adjusting voltages V1_slv1 and V2_slv1 to be applied to the solenoid valves 105$c$ and 105$d$, thereby engaging and disengaging the first synchromesh mechanism 21.

Further, in order to realize a desired position of the second synchromesh mechanism 22, the powertrain control unit 100 controls the currents of the solenoid valves 105$e$ and 105$f$ by adjusting voltages V1_slv2 and V2_slv2 to be applied to the solenoid valves 105$e$ and 105$f$, thereby engaging and disengaging the second synchromesh mechanism 22.

Further, in order to realize a desired position of the third synchromesh mechanism 23, the powertrain control unit 100 controls the currents of the solenoid valves 105$g$ and 105$h$ by adjusting voltages V1_slv3 and V2_slv3 to be applied to the solenoid valves 105$g$ and 105$h$, thereby engaging and disengaging the third synchromesh mechanism 23.

Further, in order to realize a desired position of the fourth synchromesh mechanism 24, the powertrain control unit 100 controls the currents of the solenoid valves 105$i$ and 105$j$ by adjusting voltages V1_slv4 and V2_slv4 to be applied to the solenoid valves 105$i$ and 105$j$, thereby engaging and disengaging the fourth synchromesh mechanism 24.

Incidentally, the powertrain control unit 100 is provided with a current detection circuit (not illustrated), and the current of each solenoid valve is controlled by changing a voltage output such that the current of each solenoid valve follows a target current.

Further, a first input shaft rotation speed NiA, a second input shaft rotation speed NiB, and an output shaft rotation speed No are input to the powertrain control unit 100 from the rotation sensor 31, the rotation sensor 32, and the rotation sensor 33, respectively.

Further, an ON/OFF signal Brk, configured to detect whether a brake is stepped on, is input to the powertrain control unit 100 from a brake switch 304.

Further, a sleeve 1 position RPslv 1, a sleeve 2 position RPslv 2, a sleeve 3 position RPslv 3, and a sleeve 4 position RPslv 4, which indicate respective stroke positions of the first synchromesh mechanism 21, the second synchromesh mechanism 22, the third synchromesh mechanism 23, and the fourth synchromesh mechanism 24, are input to the powertrain control unit 100 from the sleeve 1 position sensor 61$a$, the sleeve 2 position sensor 62$a$, the sleeve 3 position sensor 63$a$, and the sleeve 4 position sensor 64$a$.

Further, a clutch A hydraulic pressure sensor 65 capable of detecting a hydraulic pressure Pcla of the first clutch 8 and a clutch B hydraulic pressure sensor 66 capable of detecting a hydraulic pressure Pclb of the second clutch 9 are input to the powertrain control unit 100.

A vehicle speed Vsp is transmitted from the powertrain control unit 100 to the parking assistance control device 110 using the communication means 103, and the parking assistance control device 110 receives a signal from a display or an operation switch and controls an operation/non-operation state of the parking assistance device. Further, the parking assistance control device 110 transmits an operation/non-operation state fPark of the parking assistance device to the powertrain control unit 100 using the communication means 103. Further, the parking assistance device 110 estimates or detects a current host vehicle position based on the vehicle speed, the camera, or the like, and transmits a target gear position based on the detected position to the powertrain control unit 100 using the communication means 103.

Next, a control method using a control device of an automatic transmission according to the present embodiment will be described with reference to FIGS. 7 to 12.

Figure 7:
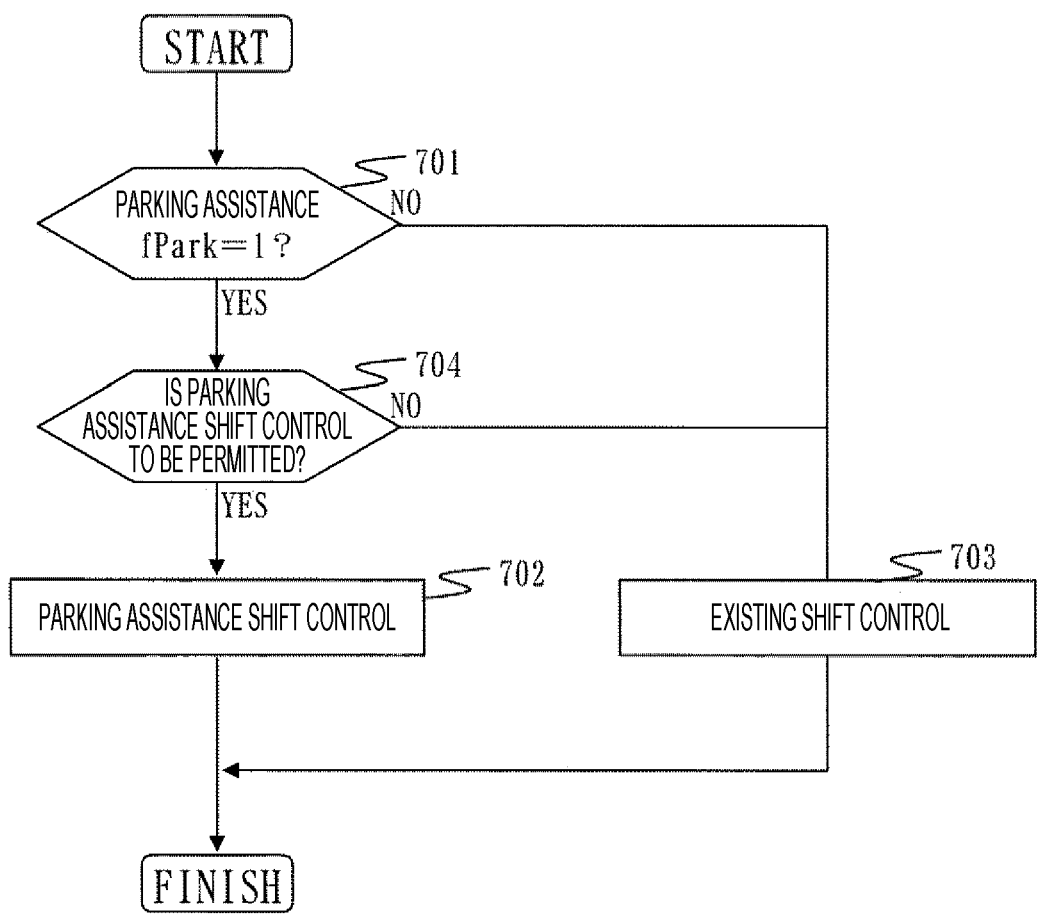
FIG. 7 is a flowchart illustrating an outline of an overall control content of a control method according to the embodiment of the present invention.

FIG. 7 is a flowchart illustrating an outline of an overall control content of the control device for the automatic transmission according to the first embodiment of the present invention.

The content of FIG. 7 is programmed in the computer 100$c$ of the powertrain control unit 100 and is repeatedly executed at a cycle set in advance. That is, the processing of the following steps 701 to 703 is executed by the powertrain control unit 100.

Step 701 is a step of determining whether to execute parking assistance control. Whether to execute parking assistance is determined based on fPark received from the parking assistance control device 110 using the communication means 103, and it is determined to execute the parking assistance if fPark is "1" and the processing proceeds to step 704. It is determined not to execute the parking assistance if fPark is "0", and the processing proceeds to step 703 to execute the existing shift control.

Step 704 is a step of determining whether to permit the execution of parking assistance shift control. When the execution of the parking assistance shift control is permitted, the processing proceeds to step 702, and the parking assistance shift control is executed. When not permitted, the processing proceeds to step 703, and the existing shift control is executed.

It is desirable that the permission of the execution of the parking assistance shift control is determined based on a state of the transmission. When a lubricating oil temperature of the transmission is lower than a predetermined oil temperature set in advance, the controllability of the transmission is poor and a drag of the wet-type clutch is also large, and thus, it is desirable not to permit the execution.

Further, when the engine rotation speed is higher than a rotation speed set in advance, for example, because an engine water temperature is low or an engine load is large due to an air conditioner or the like, the drag of the wet-type clutch is also large, and thus, it is desirable not to permit the execution.

Further, it is desirable not to permit the execution when a drag torque is larger than a value set in advance by estimating the drag torque of the lubricating oil based on an engine rotation speed, a clutch rotation speed, a lubricating oil temperature, a lubrication amount, and a clearance of a clutch.

Figure 8:
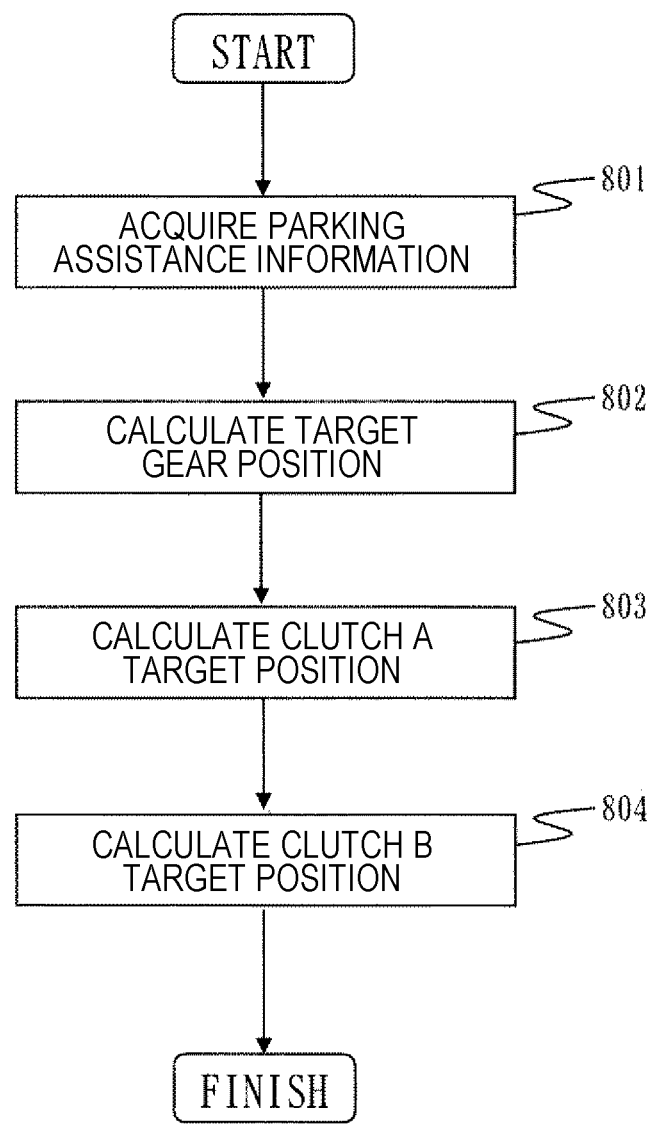
FIG. 8 is a flowchart illustrating an outline of parking assistance shift control according to the embodiment of the present invention.

Next, step 702 in FIG. 7 will be described in detail with reference to FIG. 8.

Step 801 is a parking information acquisition step of receiving necessary information in the present embodiment from the parking assistance control device 110 using the communication means 103.

Step 802 is a target gear position calculation step of calculating a target assistance position when executing the parking assistance control.

Step 803 is a clutch A target position calculation step of selecting a clutch to transmit a drive force based on the calculation result of step 802 and calculating a clutch A target position.

Step 804 is a clutch B target position calculation step of selecting a clutch to transmit a drive force based on the calculation result of step 802 and calculating a clutch B target position.

Next, step 801 in FIG. 8 will be described in detail with reference to FIG. 9.

Figure 9:
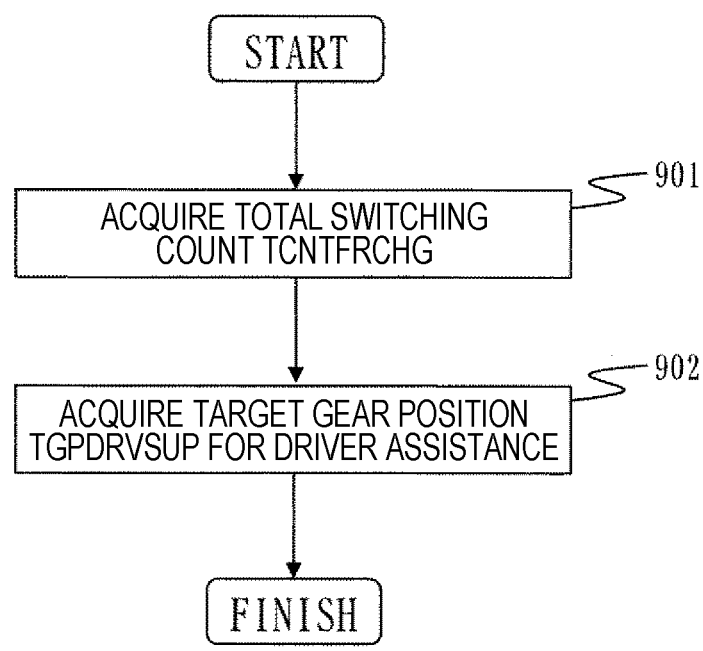
FIG. 9 is a flowchart illustrating an outline of parking assistance information acquisition according to the embodiment of the present invention.

FIG. 9 illustrates the parking information acquisition step which is the step of receiving the necessary information in the present embodiment from the parking assistance control device 110 using the communication means 103.

Step 901 is a total switching count TCNTFRCHG acquisition step of causing the parking assistance control device 110 to calculate a route from a host vehicle position to a target parking position at the time of executing the parking assistance control, calculate a switching count between forward control and reverse control during the route, and transmit the calculated switching count using the communication means 103, and causing the powertrain control unit 100 to acquire the received switching count as the total switching count TCNTFRCHG.

Here, the total switching count TCNTFRCHG is the switching count between forward control and reverse control during the route from the host vehicle position to the target parking position at the time of executing the parking assistance control in the case of parking the vehicle, but is a switching count between forward control and reverse control during a route from the host vehicle position to a target pulling-out position in the case of pulling out the vehicle.

Step 902 is a target gear position TGPDRVSUP acquisition step at the time of executing the parking assistance control. The parking assistance control device 110 calculates a target gear position during execution of the parking assistance control based on the host vehicle position detected or estimated from a vehicle speed VSP and the camera and transmits the calculated target gear position using the communication means 103, and the powertrain control unit 100 acquires the received target gear position as the target gear position TGPDRVSUP.

Here, the present embodiment is configured such that the target gear position is acquired from the parking assistance control device 110 via the communication means 103, but it suffices to know a direction of target forward/reverse movement, and forward/reverse movement instruction information may be acquired instead of the target gear position.

Figure 10:
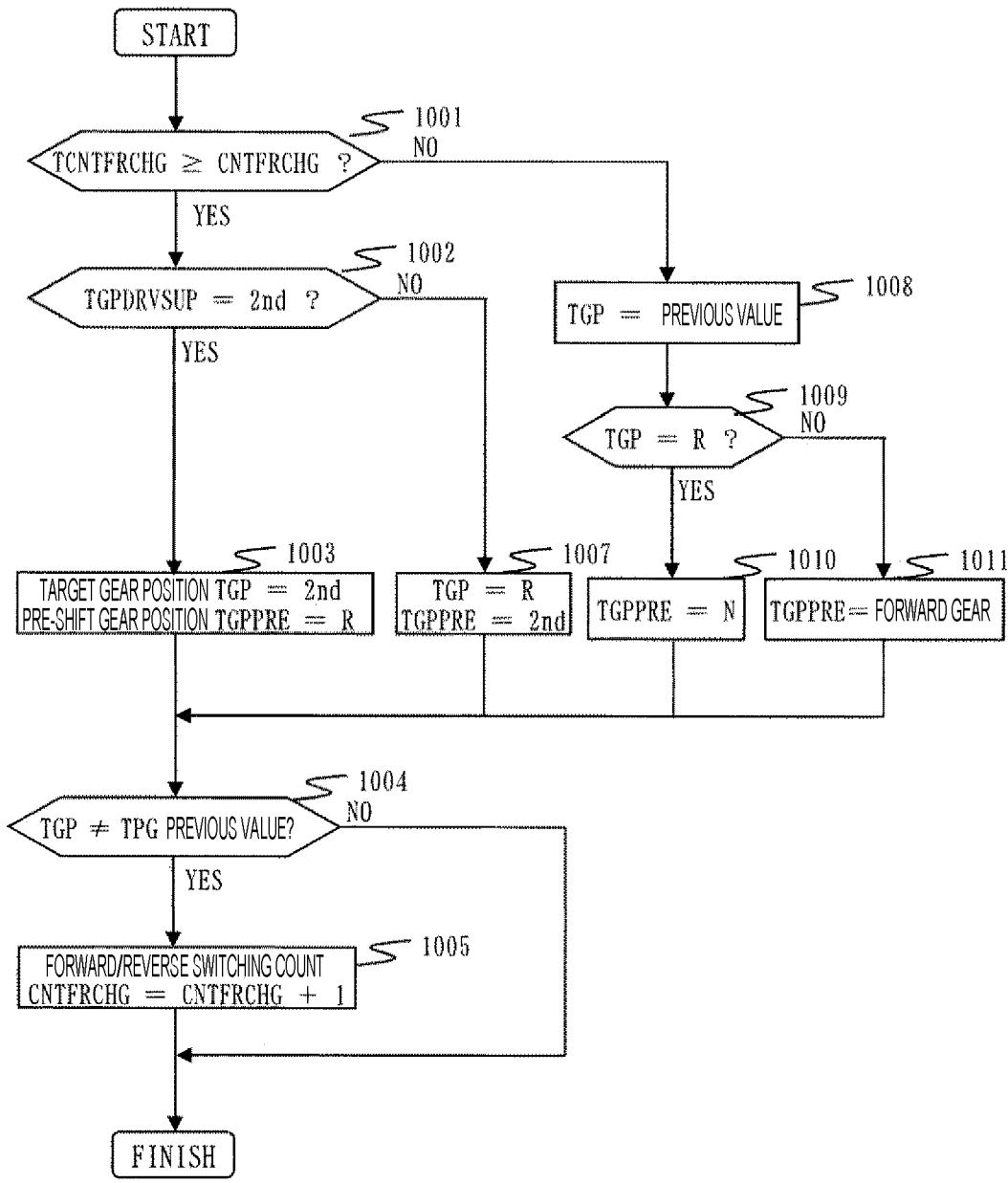
FIG. 10 is a flowchart illustrating an outline of a target gear position calculation according to the embodiment of the present invention.

Next, step 802 in FIG. 8 will be described in detail with reference to FIG. 10. Step 802 is the target gear position calculation step of calculating a final target gear position based on the information received using the communication means 103 from the parking assistance control device 110 in step 801.

Step 1001 is a step of determining whether a current forward/reverse control switching count CNTFRCHG has reached the total switching count TCNTFRCHG. The processing proceeds to step 1008 when the switching count CNTFRCHG calculated in step 1005 has reached the total switching count TCNTFRCHG, and proceeds to step 1002 when the switching count CNTFRCHG does not reach the total switching count TCNTFRCHG.

Step 1002 is a step of determining whether the target gear position TGPDRVSUP is a second gear. In the case of the second gear, the processing proceeds to step 1003, the second gear is set to the target gear position TGP, and a reverse gear (R) is set to a pre-shift gear position TGPPRE. When the target gear position TGPDRVSUP is not the second gear, the processing proceeds to step 1007, the reverse gear is set to the target gear position TGP, and the second gear is set to the pre-shift gear position TGPPRE.

Here, step 1002 is the determination based on the gear position, but may be determination on forward or reverse control. In the case of the forward control, forward gear is set to the target gear position TGP, and a reverse gear is set to the pre-shift gear position TGPPRE. In the case of the reverse control, the reverse gear may be set to the target gear position TGP and the forward gear may be set to the pre-shift gear position TGPPRE.

Step 1004 is a step of determining whether the target gear position TGP has changed. When the target gear position TGP has changed, the processing proceeds to step 1005 to count up the forward/reverse control switching count switching count CNTFRCHG.

Step 1008 is a step of a case where the forward/reverse control switching count switching count CNTFRCHG has reached the total switching count TCNTFRCHG, and a previous value of the target gear position TGP is held since there is no need of forward/reverse control switching.

Step 1009 is a step of determining whether the target gear position TGP is the reverse gear. In the case of the reverse gear, the processing proceeds to step 1010, neutral (N) is set to the pre-shift gear position TGPPRE. When the forward/reverse control switching count switching count CNTFRCHG has reached the total switching count TCNTFRCHG, there is no subsequent switching between forward control and reverse control and it is difficult to predict the next gear, and thus, the neutral is set to be capable of dealing with any situation.

When it is determined in step 1009 that the target gear position TGP is not the reverse gear, the forward gear is set. Here, the forward gear is desirably set to be one step higher or one step lower than the target gear position TGP.

Figure 11:
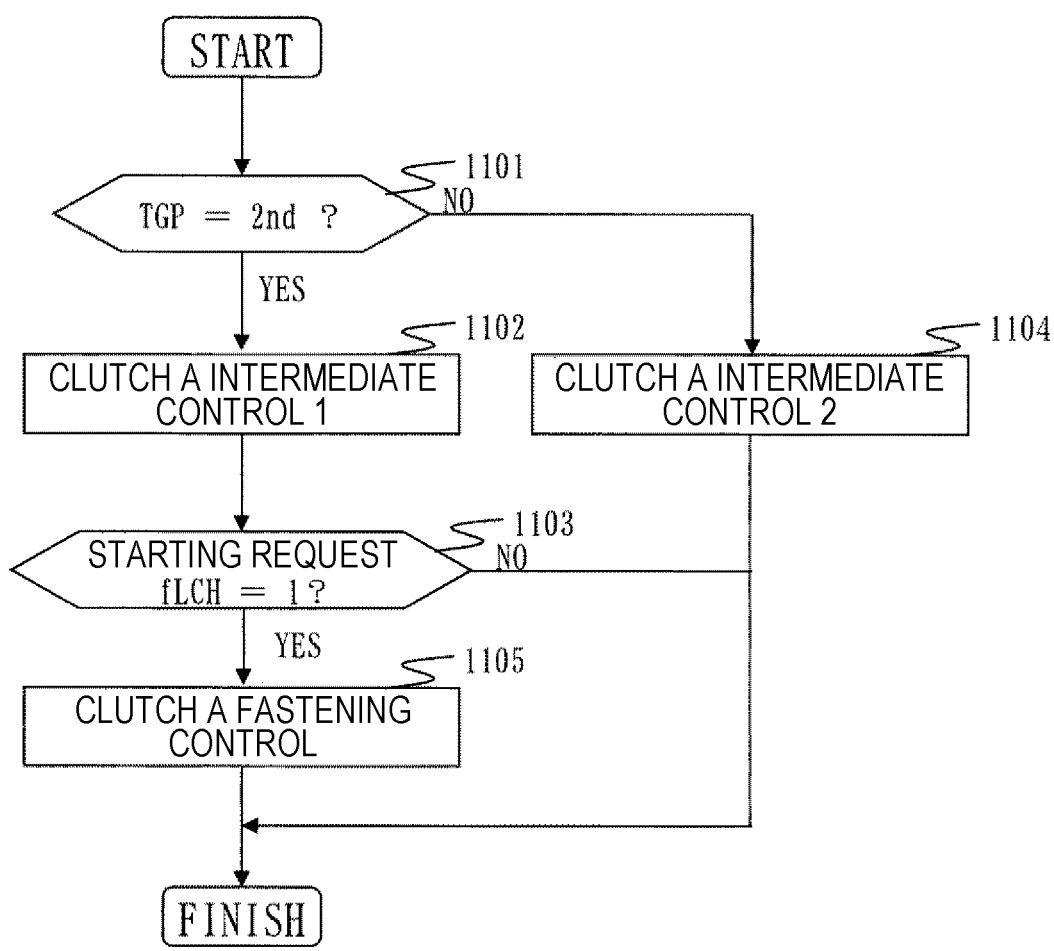
FIG. 11 is a flowchart illustrating an outline of clutch target position calculation according to the embodiment of the present invention.

Next, step 803 in FIG. 8 will be described in detail with reference to FIG. 11.

Step 1101 is a step of determining whether the target gear position TGP is the second gear. When the target gear position TGP is the second gear, the processing proceeds to step 1102, a clutch A is set to an intermediate state 1, and it is determined whether a starting request fLCH is "1" in step 1103. The starting request fLCH is desirably "0" when a brake switch is ON or is desirably "1" as the presence of the starting request when the brake switch is OFF. When the starting request fLCH is "1", the processing proceeds to step 1105, and the fastening control of the clutch A is executed so as to control the clutch to the contact state. When the starting request fLCH is "0", the intermediate control which has been executed in step 1102 is continued. When the target gear position TGP is not the second gear in step 1101, the processing proceeds to step 1104, and the clutch A is set to an intermediate state 2 and the processing is finished.

Figure 23:
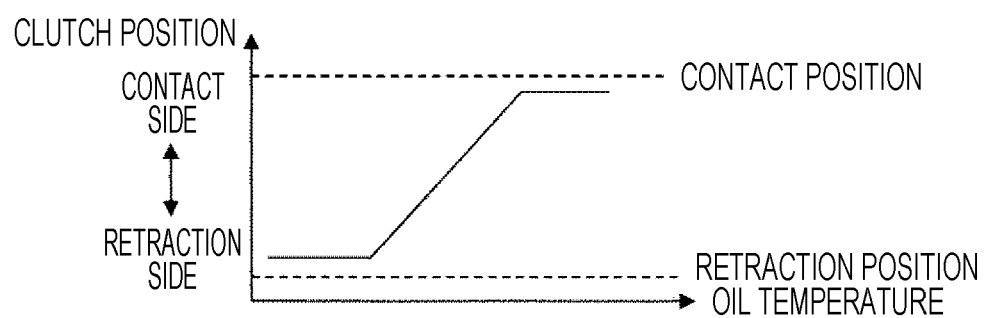
FIG. 23 is a graph illustrating a relationship between a clutch position and an oil temperature in an intermediate state.

Here, an intermediate control 1 in step 1102 and an intermediate control 2 in step 1104 are desirably capable of changing the clutch position in the intermediate state in accordance with an oil temperature as illustrated in FIG. 23, and particularly, desirably set the clutch intermediate state to be closer to the contact side as the temperature of the lubricating oil supplied to the driving-side connector and the driven-side connector increases. With such a configuration, it is possible to reduce influence of a dragging torque when the oil temperature is low.

Figure 24:
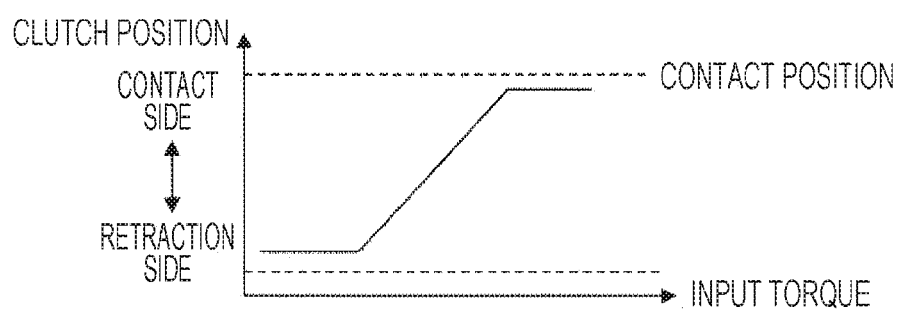
FIG. 24 is a graph illustrating a relationship between a clutch position and an input torque in the intermediate state.

Further, the intermediate control 1 in step 1102 and the intermediate control 2 in step 1104 are desirably capable of changing the clutch position in the intermediate state in accordance with a torque input to the driving-side connector as illustrated in FIG. 24, and particularly, desirably set the clutch intermediate state to be closer to the contact side as the input torque increases. With such a configuration, it is possible to suppress racing of the engine rotation speed while improving the response to the high torque.

Figure 25:
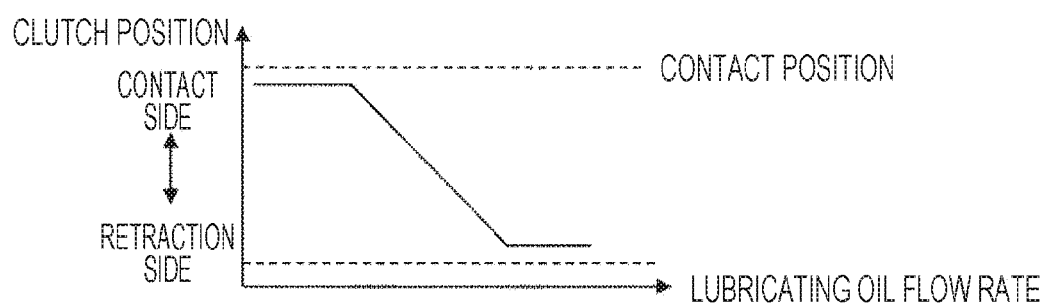
FIG. 25 is a graph illustrating a relationship between a clutch position and a flow rate of lubricating oil in the intermediate state.

Further, the intermediate control 1 in step 1102 and the intermediate control 2 in step 1104 are desirably capable of changing the clutch position in the intermediate state in accordance with a flow rate of the lubricating oil supplied to the driving-side connector and the driven-side connector as illustrated in FIG. 25, and particularly, desirably set the clutch intermediate state to be closer to the retraction side as the lubricating oil flow rate increases. With such a configuration, it is possible to reduce influence of a dragging torque when the oil temperature is low.

Further, it is desirable to perform setting based on FIGS. 23, 24, and 25 in the intermediate control 1 of step 1102 and the intermediate control 2 of step 1104, and the setting in step 1104 is desirably set to the retraction side as compared with the setting in step 1102.

Next, the clutch A fastening control in step 1105 will be described in detail.

Next, step 1105 is a step of changing the clutch from the intermediate state to the contact state. A pushing load of the clutch is increased in accordance with the torque input to the driving-side connector to increase the clutch transmission torque.

The clutch transmission torque is changed in accordance with an increase DTCI and a decrease DTCD set in advance.

The increase DTCI and the decrease DTCD are desirably set by a shock due to a sudden change in the transmission torque and a drive force response, and may be configured to be changeable by the driver using a navigation system or the like.

Further, the presence or absence of a following vehicle is confirmed using an external world recognition sensor such as a camera, and the increase DTCI and the decrease DTCD may be increased in order for quick parking when there is the following vehicle, and the increase DTCI and the decrease DTCD may be decreased in order for better ride comfort when there is no following vehicle.

Further, the increase DTCI and the decrease DTCD may be increased in order for quick parking when the driver is not aboard the automobile, and the increase DTCI and the decrease DTCD may be decreased in order for better ride comfort when the driver is aboard the automobile.

With such a configuration, it is possible to achieve both the shock and the response in accordance with a driving scene.

Figure 12:
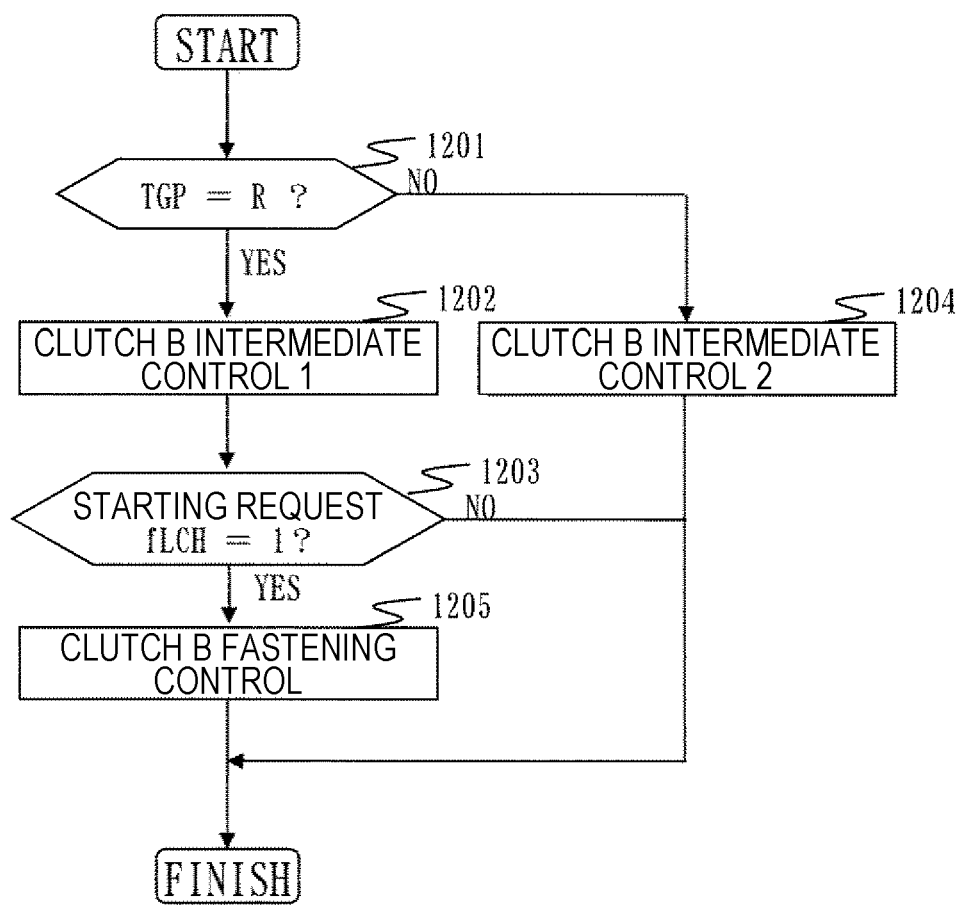
FIG. 12 is a flowchart illustrating an outline of the clutch target position calculation according to the embodiment of the present invention.

Next, step 804 in FIG. 8 will be described in detail with reference to FIG. 12.

Step 1201 is a step of determining whether the target gear position TGP is the R gear. When the target gear position TGP is the R gear, the processing proceeds to step 1202, a clutch B is set to an intermediate state 1, and it is determined whether the starting request fLCH is "1" in step 1203. The starting request fLCH is desirably "0" when a brake switch is ON or is desirably "1" as the presence of the starting request when the brake switch is OFF. When the starting request fLCH is "1", the processing proceeds to step 1205, and the fastening control of the clutch B is executed so as to control the clutch to the contact state. When the starting request fLCH is "0", the intermediate control which has been executed in step 1202 is continued. When the target gear position TGP is not the R gear in step 1201, the processing proceeds to step 1204, and the clutch B is set to an intermediate state 2 to the processing is finished.

Here, the intermediate control 1 in step 1202 and the intermediate control 2 in step 1204 are desirably capable of changing the clutch position in the intermediate state in accordance with an oil temperature as illustrated in FIG. 23, and particularly, desirably set the clutch intermediate state to be closer to the contact side as the temperature of the lubricating oil supplied to the driving-side connector and the driven-side connector increases. With such a configuration, it is possible to reduce influence of a dragging torque when the oil temperature is low.

Further, the intermediate control 1 in step 1202 and the intermediate control 2 in step 1204 are desirably capable of changing the clutch position in the intermediate state in accordance with a torque input to the driving-side connector as illustrated in FIG. 24, and particularly, desirably set the clutch intermediate state to be closer to the contact side as the input torque increases. With such a configuration, it is possible to suppress racing of the engine rotation speed while improving the response to the high torque.

Further, the intermediate control 1 in step 1202 and the intermediate control 2 in step 1204 are desirably capable of changing the clutch position in the intermediate state in accordance with a flow rate of the lubricating oil supplied to the driving-side connector and the driven-side connector as illustrated in FIG. 25, and particularly, desirably set the clutch intermediate state to be closer to the retraction side as the lubricating oil flow rate increases. With such a configuration, it is possible to reduce influence of a dragging torque when the oil temperature is low.

Further, it is desirable to perform setting based on FIGS. 23, 24, and 25 in the intermediate control 1 of step 1102 and the intermediate control 2 of step 1104, and the setting in step 1104 is desirably set to the retraction side as compared with the setting in step 1102.

Next, the clutch A fastening control in step 1105 will be described in detail. Step 1105 is a step of changing the clutch from the intermediate state to the contact state. A pushing load of the clutch is increased in accordance with the torque input to the driving-side connector to increase the clutch transmission torque.

Next, an operation at the time of executing the parking assistance in the control device of the automatic transmission according to the control method of the present embodiment will be described with reference to FIGS. 13 to 19.

Figure 13:
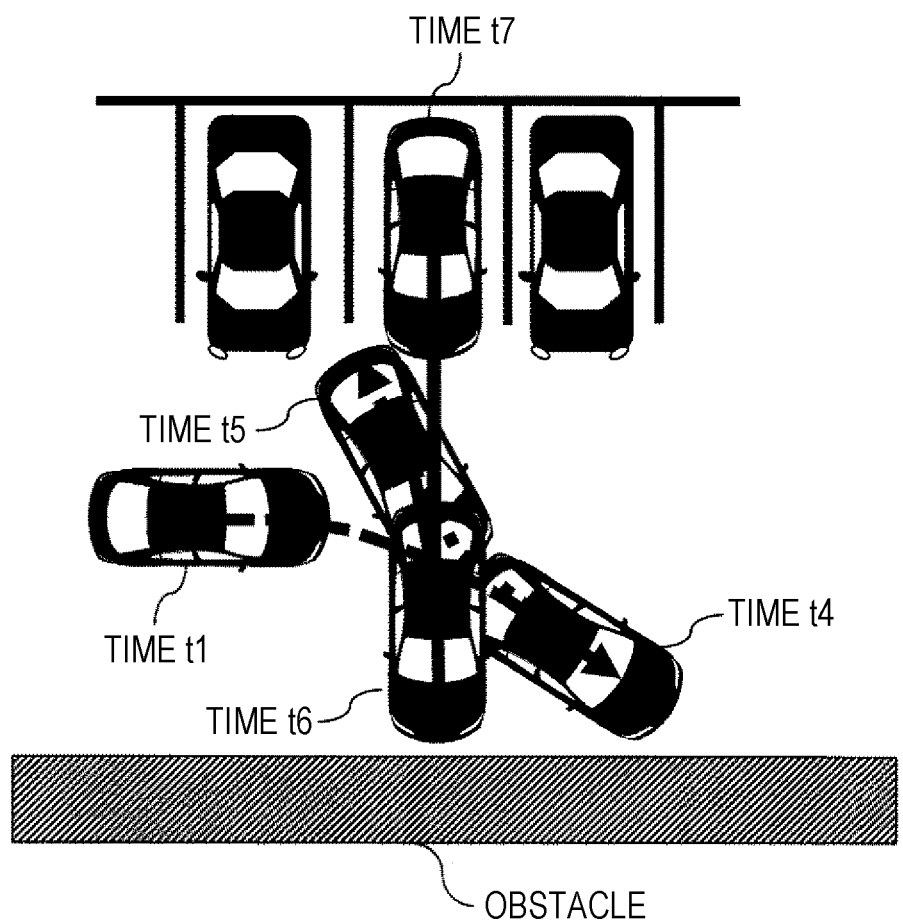
FIG. 13 is a schematic diagram of a vehicle route during parking according to the embodiment of the present invention.

FIG. 13 illustrates a route of the vehicle during automatic parking according to the present embodiment. When the parking assistance is executed at a time t1, an accelerator, a brake, and a steering are automatically operated by the parking assistance control device, and the vehicle moves to a position at a time t4. When the parking assistance control device detects an obstacle at the time t4, the vehicle stops, and the target gear position is set to the reverse gear to reverse the vehicle to a position at a time t5. When the parking assistance control device detects an obstacle behind the vehicle at the time t5, the forward gear is set as the target gear to move the vehicle to a position at a time t6. When the parking assistance control device detects an obstacle at the time t6, the vehicle stops, the reverse gear is set as the target gear to reverse the vehicle, and the vehicle stops at a position at a time t7.

Figure 14:
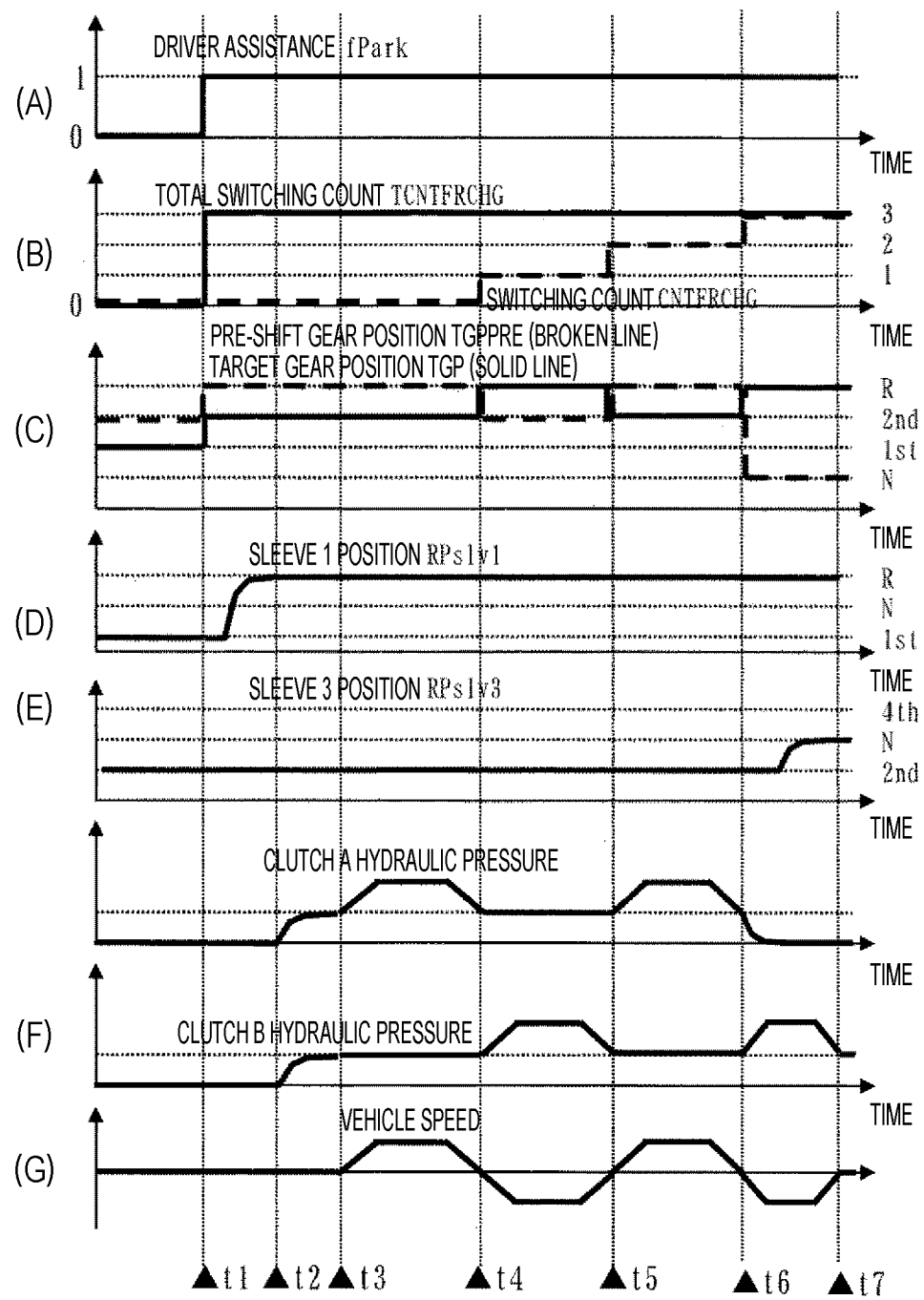
FIG. 14 is a time chart illustrating an operation during parking according to the embodiment of the present invention.

Next, the operation of FIG. 13 will be described in detail with reference to FIG. 14. FIG. 14 is a time chart at the time of executing the parking assistance according to the control method of the present embodiment. Times t1 to t7 in FIG. 14 illustrate the same states as the times t1 to t7 in FIG. 13.

Before the time t1, the parking assistance has not been executed yet, the target gear position TGP is the first gear, the pre-shift gear position TGPPRE is the second speed, and each of the clutch A and the clutch B is in the retracted state, and thus, the vehicle speed is zero, and the vehicle is stopped.

At the time t1, the parking assistance fPark is set by the parking assistance control device, "3" is set as the total switching count TCNTFRCHG by the parking assistance control device, the target gear position TGP is the second gear, the pre-shift gear position TGPPRE is the reverse gear (R), and the sleeve 1 and the sleeve 3 are engaged with the R gear and the second gear, respectively.

When the sleeve 1 and the sleeve 3 are completely engaged at the time t2, each of the clutch A and the clutch B is set to the intermediate state. When the clutch A is controlled to the contact state at the time t3, the vehicle starts moving forward, and thus, the vehicle speed increases as a positive value, the vehicle stops at the time t4, and the clutch A is set to the intermediate state.

When the target gear position is set to "R" by the parking assistance control device at the time t4, the switching count CNTFRCHG is counted up, and the clutch B is set to the contact state while holding the intermediate state of the clutch A. Since the vehicle starts reverse movement, the vehicle speed increases as a negative value, the vehicle stops at the time t5, and the clutch B is set to the intermediate state.

When the target gear position is set to the second gear again by the parking assistance control device at the time t5, the switching count CNTFRCHG is counted up, and the clutch A is set to the contact state while holding the intermediate state of the clutch B. Since the vehicle starts forward movement, the vehicle speed increases as a positive value, the vehicle stops at the time t6, and the clutch A is set to the intermediate state.

When the target gear position is set to "R" again by the parking assistance control device at the time t6, the switching count CNTFRCHG is counted up to coincide with the total switching count TCNTFRCHG. Accordingly, the target gear position is held at "R" and the pre-shift gear position is "N", and thus, the clutch A is set to the retracted state and the clutch B is set to the contact state so that the vehicle starts reverse movement. Thus, the vehicle speed increases as a negative value, and the vehicle stops at the time t7.

Figure 15:
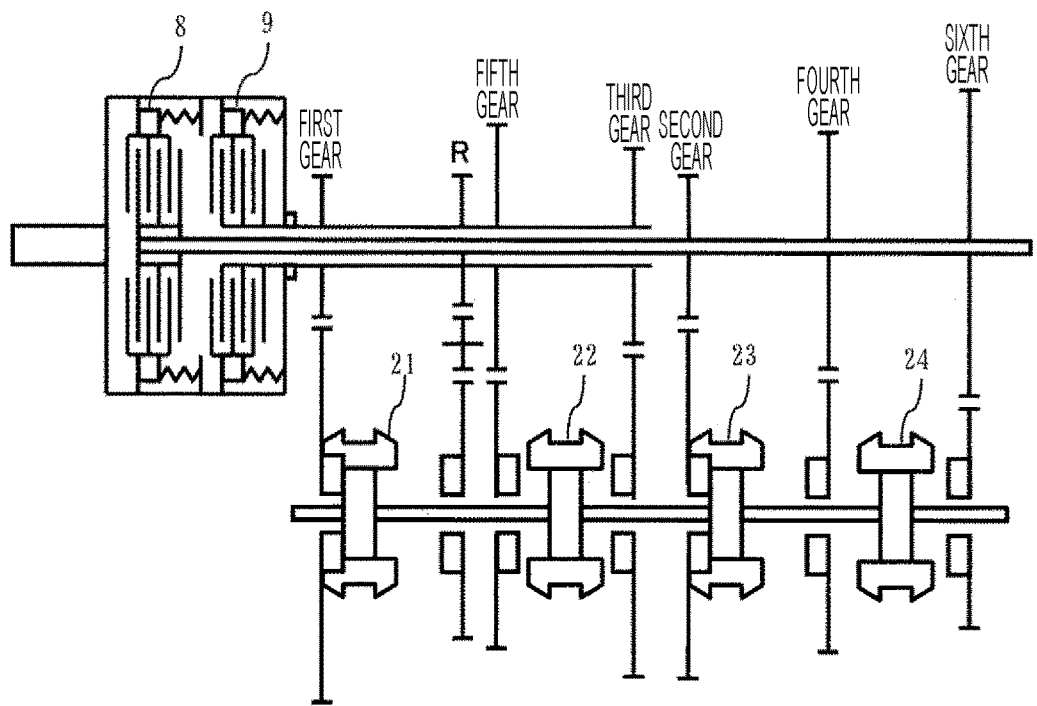
FIG. 15 is a skeleton diagram of the operation during parking according to the embodiment of the present invention.

FIG. 15 is a skeleton diagram of the present embodiment illustrating a state before the time t1. Before the time t1, the first synchromesh mechanism 21 is fastened to the first gear, the third synchromesh mechanism 23 is fastened to the second gear, and the clutch A (8) and the clutch B (9) are set to the retracted state.

Figure 16:
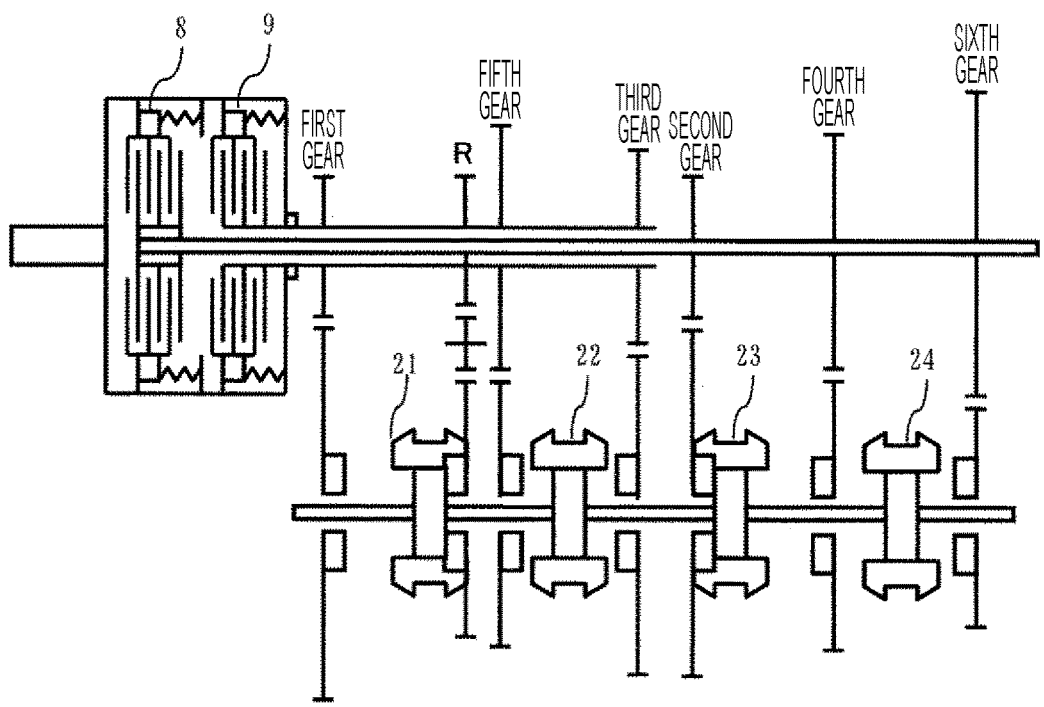
FIG. 16 is a skeleton diagram of the operation during parking according to the embodiment of the present invention.

FIG. 16 is a skeleton diagram of the present embodiment illustrating a state at the time t2. When the parking assistance fPark is set at the time t2, the first synchromesh mechanism 21 is fastened to R.

Figure 17:
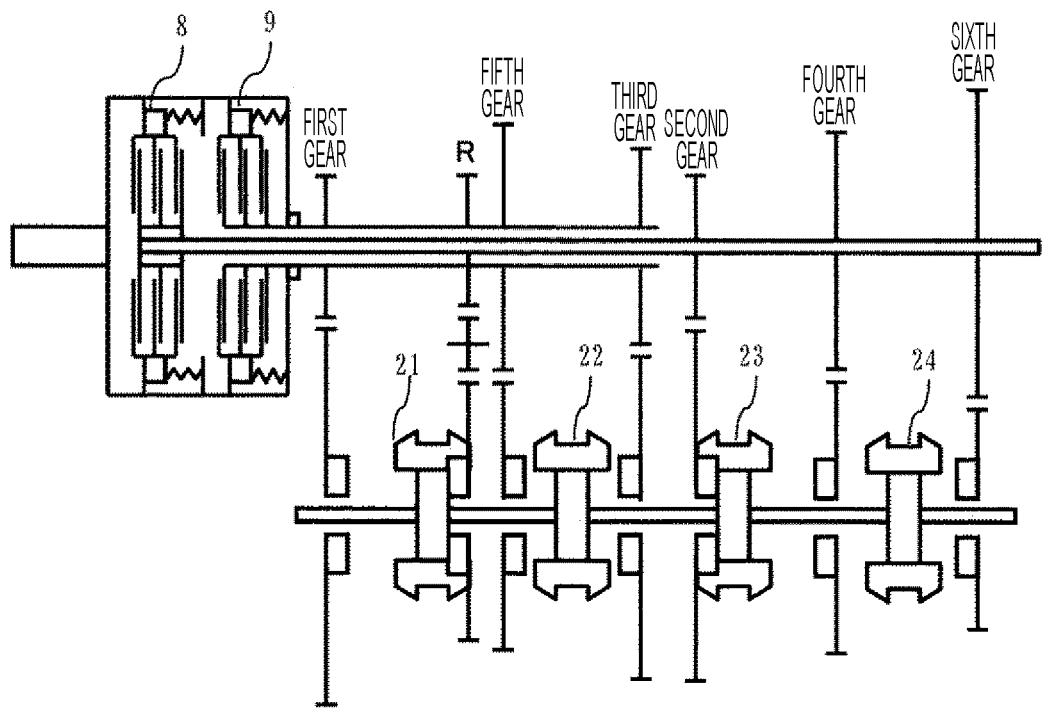
FIG. 17 is a skeleton diagram of the operation during parking according to the embodiment of the present invention.

FIG. 17 is a skeleton diagram of the present embodiment illustrating a state at the time t3. When the fastening of the first synchromesh mechanism 21 to R is completed at time the t3, both the clutch A (8) and the clutch B (9) are set to the intermediate state.

Figure 18:
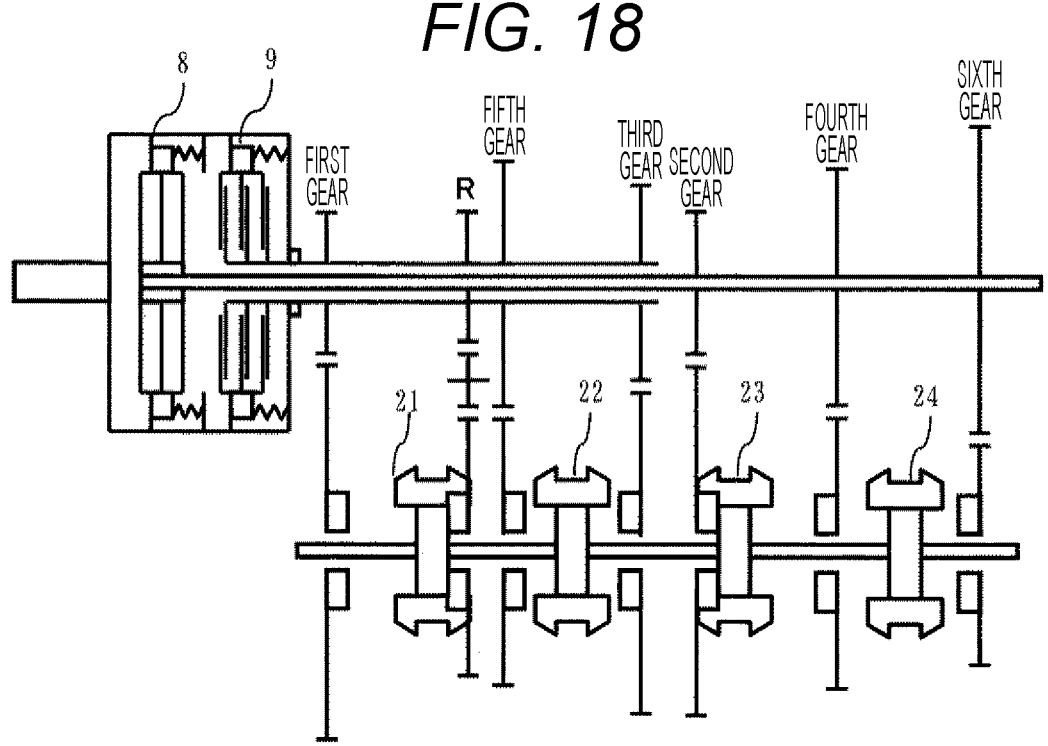
FIG. 18 is a skeleton diagram of the operation during parking according to the embodiment of the present invention.

FIG. 18 is a skeleton diagram of the present embodiment illustrating a state where the vehicle is moving forward from the times t3 to t4. From the times t3 to t4, the clutch A (8) is set to the contact state while holding the intermediate state of the clutch B (9).

Figure 19:
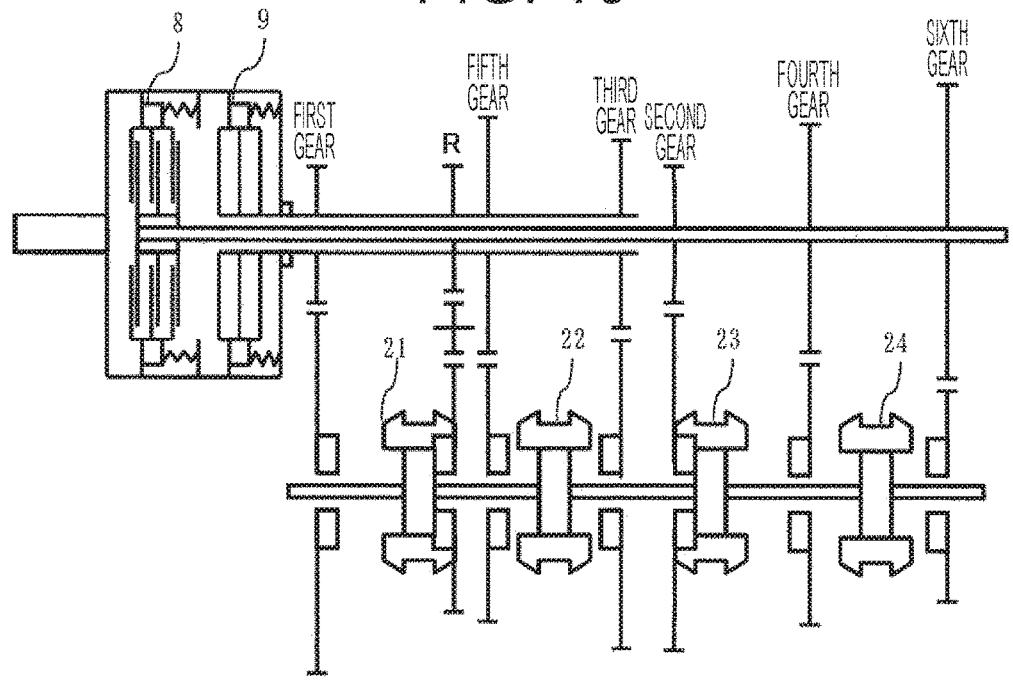
FIG. 19 is a skeleton diagram of the operation during parking according to the embodiment of the present invention.

FIG. 19 is a skeleton diagram of the present embodiment illustrating a state where the vehicle is reversing from the times t4 to t5. From the times t4 to t5, the clutch B (9) is set to the contact state while holding the intermediate state of the clutch A (8).

Figure 20:
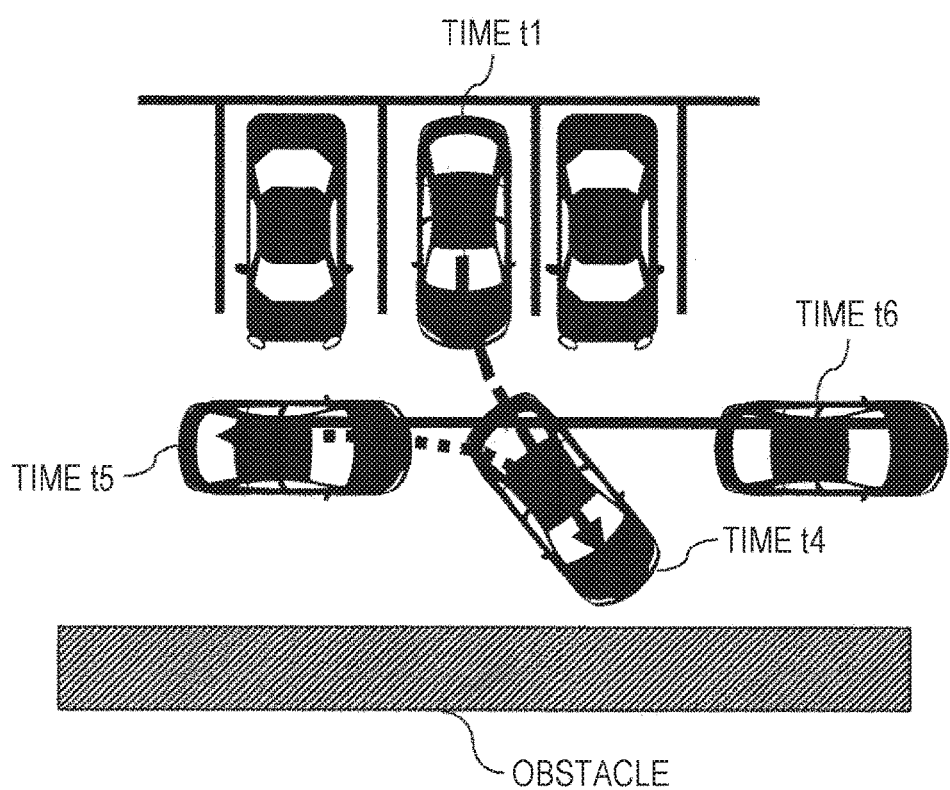
FIG. 20 is a schematic diagram of a vehicle route during pulling-out according to the embodiment of the present invention.
Figure 21:
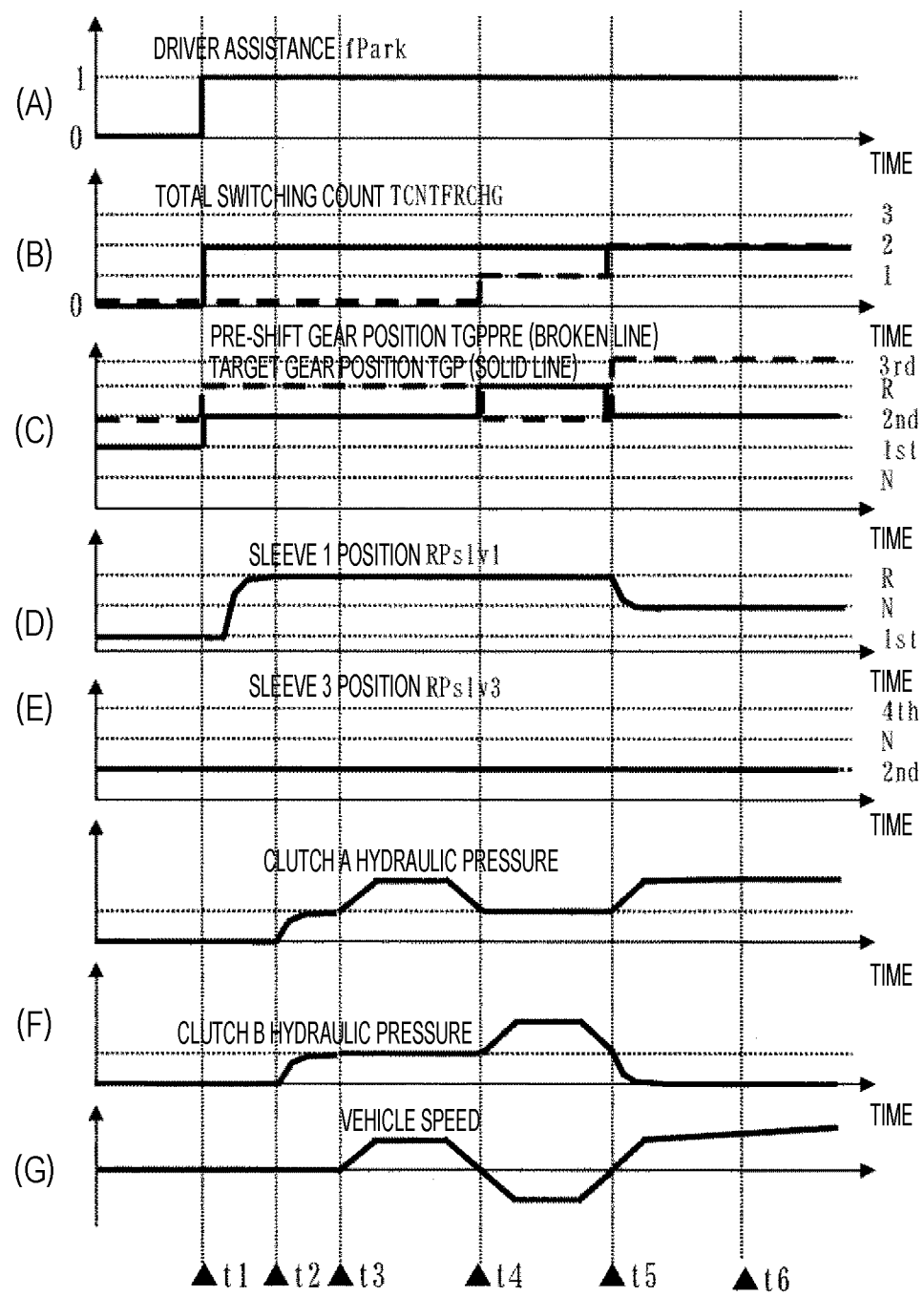
FIG. 21 is a time chart illustrating the operation during pulling-out according to the embodiment of the present invention.

Next, an operation at the time of pulling-out in the control device of the automatic transmission according to the control method of the present embodiment will be described with reference to FIGS. 20 and 21. FIG. 20 illustrates a route of the vehicle at the time of pulling-out according to the present embodiment. When the parking assistance is executed at a time t1, an accelerator, a brake, and a steering are automatically operated by the parking assistance control device, and the vehicle moves to a position at a time t4. When the parking assistance control device detects an obstacle at the time t4, the vehicle stops, and the target gear position is set to the reverse gear to reverse the vehicle to a position at a time t5. When the parking assistance control device detects that there is no obstacle ahead of the vehicle at the time t5, the forward gear is set as the target gear and the vehicle is moved to the position at the time t6.

Next, the operation of FIG. 20 will be described in detail with reference to FIG. 21. FIG. 21 is a time chart at the time of executing the parking assistance according to the control method of the present embodiment. Times t1 to t7 in FIG. 21 illustrate the same states as the times t1 to t7 in FIG. 20.

Before the time t1, the parking assistance has not been executed yet, the target gear position TGP is the first gear, the pre-shift gear position TGPPRE is the second speed, and each of the clutch A and the clutch B is in the retracted state, and thus, the vehicle speed is zero, and the vehicle is stopped.

At the time t1, the parking assistance fPark is set by the parking assistance control device, "2" is set as the total switching count TCNTFRCHG by the parking assistance control device, the target gear position TGP is the second gear, the pre-shift gear position TGPPRE is the reverse gear (R), and the sleeve 1 and the sleeve 3 are engaged with the R gear and the second gear, respectively.

When the sleeve 1 and the sleeve 3 are completely engaged at the time t2, each of the clutch A and the clutch B is set to the intermediate state. When the clutch A is controlled to the contact state at the time t3, the vehicle starts moving forward, and thus, the vehicle speed increases as a positive value, the vehicle stops at the time t4, and the clutch A is set to the intermediate state.

When the target gear position is set to the second gear again by the parking assistance control device at the time t5, the switching count CNTFRCHG is counted up to coincide with the total switching count TCNTFRCHG. Accordingly, the target gear position is held at the second gear, and the pre-shift gear position is set to the third gear, which is the forward gear, and thus, the clutch B is set to the retracted state and the clutch A is set to the contact state. Since the vehicle starts forward movement, the vehicle speed increases as a positive value.

Conventionally, there is an automatic transmission in which a forward gear is fastened and a forward clutch is set to a standby state to improve a forward starting response in a D range, and an R gear is fastened and a reverse clutch is set to a standby state to improve a reverse starting response in an R range. However, the gears and clutches to be used are different between the D range and the R range, and thus, the response deteriorates due to a switching operation during parking in which D/R is frequently switched so that it is likely to cause a feeling of sluggishness during the automatic parking.

On the other hand, in the present embodiment, when a request for automatic parking has been determined, the forward clutch and the reverse clutch are set to the standby state in order to reduce the feeling of sluggishness during the automatic parking. In this manner, it is possible to shorten the forward/reverse control switching time in the vehicle including the automatic transmission provided with the parking assistance device.

Figure 22:
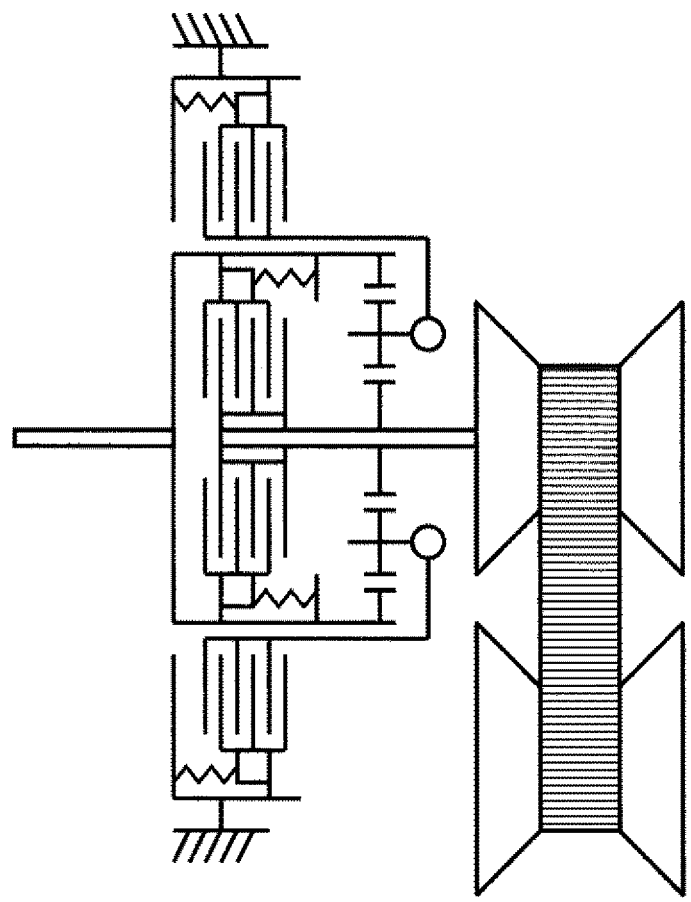
FIG. 22 is a skeleton diagram illustrating a configuration of a control device for an automatic transmission according to a second embodiment of the present invention.

Incidentally, the twin-clutch type automatic MT has been described in the present embodiment, but it suffices to use a transmission including a clutch for switching between forward control and backward control, and a continuously variable transmission as illustrated in FIG. 22 may be used, or an automatic transmission that achieves gear stages by a plurality of clutches and a plurality of planetary gears may be used.

REFERENCE SIGNS LIST 1, 11 gear (first gear)
2, 12 gear (second gear)
3, 13 gear (third gear)
4, 14 gear (fourth gear)
5, 15 gear (fifth gear)
6, 16 gear (sixth gear)
7 engine
8 first clutch
9 second clutch
21 first synchromesh mechanism (first to third gears)
22 second synchromesh mechanism (fifth gear)
23 third synchromesh mechanism (second to fourth gears)
24 fourth synchromesh mechanism (sixth gear)
31 input shaft rotation speed sensor
32 output shaft rotation speed sensor
41 first input shaft
42 second input shaft
43 output shaft
50 transmission
61 shift actuator (first to third gears)
62 shift actuator (fifth gear)
63 shift actuator (second to fourth gears)
64 shift actuator (fifth gear)
105 hydraulic mechanism
100 powertrain control unit
101 engine control unit
110 parking assistance control device
103 communication means

The invention claimed is:

1. A transmission control device that controls a transmission, the transmission control device comprising:
a forward power transmission mechanism configured to move a vehicle forward; and
a reverse power transmission mechanism configured to reverse the vehicle, wherein
each of the forward power transmission mechanism and the reverse power transmission mechanism comprises a driving-side connector and a driven-side connector,
the forward power transmission mechanism and the reverse power transmission mechanism are configured to be capable of changing a contact state where the driving-side connector and the driven-side connector are pushed to contact each other,
a retracted state where pushing forces are released to retract the driving-side connector and the driven-side connector,
an intermediate state formed as the intermediate state between the contact state and the retracted state,
when the vehicle is controlled based on a previously-generated control content including switching between forward control and reverse control,
one of the forward control and the reverse control is performed by controlling one power transmission mechanism between the forward power transmission mechanism and the reverse power transmission mechanism to the contact state while maintaining the other power transmission mechanism in the intermediate state, so as to prevent occurrence of the retracted state where pushing forces are released to retract the driving-side connector and the driven-side connector during parking assistance.

2. The transmission control device according to claim 1, wherein when the switching between the forward control and the reverse control is performed a plurality of times during a route from a current position of the vehicle to a target position, the intermediate state is switched, after last switching, to another state.

3. The transmission control device according to claim 1, wherein the previously-generated control content automatically guides the vehicle to a target parking position.

4. The transmission control device according to claim 1, wherein the previously-generated control content automatically guides the vehicle from a parking position to a target non-parking position.

5. The transmission control device according to claim 1, wherein the intermediate state is changed in accordance with an oil temperature.

6. The transmission control device according to claim 1, wherein the intermediate state is changed in accordance with a drive force input to the driving-side connector.

7. The transmission control device according to claim 1, wherein the intermediate state is changed in accordance with a flow rate of lubricating oil supplied to the driving-side connector and the driven-side connector.

8. The transmission control device according to claim 1, wherein in the intermediate state, an intermediate state of a power transmission mechanism is set to be closer to a contact state side as compared to an intermediate state of a power transmission mechanism being held in the intermediate state.

9. The transmission control device according to claim 1, wherein the intermediate state is released when an oil temperature is low.

10. The transmission control device according to claim 1, wherein the intermediate state is released when a rotation speed of a drive power source is high.

11. The transmission control device according to claim 1, wherein in the contact state, the pushing forces of the driving-side connector and the driven-side connector are switched in accordance with whether a driver is aboard.

12. A transmission control device that controls a transmission, the transmission control device comprising:
- a forward power transmission mechanism configured to move a vehicle forward; and
- a reverse power transmission mechanism configured to reverse the vehicle, wherein
- each of the forward power transmission mechanism and the reverse power transmission mechanism comprises source side connector and a driven-side connector,
- the forward power transmission mechanism and the reverse power transmission mechanism are configured to be capable of changing a contact state where the driving-side connector and the driven-side connector are pushed to contact each other, a retracted state where pushing forces are released to retract the driving-side connector and the driven-side connector, and
- an intermediate state formed as the intermediate state between the contact state and the retracted state, and
- when a control command relating to a previously generated control content including switching between forward control and reverse control of the vehicle is input, both the forward power transmission mechanism and the reverse power transmission mechanism are maintained the intermediate state, so as to prevent occurrence of the retracted state where pushing forces are released to retract the driving-side connector and the driven-side connector during parking assistance.

13. A transmission control device that controls a transmission, the transmission control device comprising:
- a forward power transmission mechanism configured to move a vehicle forward; and
- a reverse power transmission mechanism configured to reverse the vehicle, wherein
  - each of the forward power transmission mechanism and the reverse power transmission mechanism comprises a driving-side connector and a driven-side connector,
  - the forward power transmission mechanism and the reverse power transmission mechanism are configured to be capable of changing a contact state where the driving-side connector and the driven-side connector are pushed to contact each other,
  - a retracted state where pushing forces are released to retract the driving-side connector and the driven-side connector,
  - an intermediate state formed as the intermediate state between the contact state and the retracted state,
  - when the vehicle is controlled based on a previously-generated control content including switching between forward control and reverse control,
  - one of the forward control and the reverse control is performed by controlling one power transmission mechanism between the forward power transmission mechanism and the reverse power transmission mechanism to the contact state while controlling the other power transmission mechanism to the intermediate state, and
  - in the contact state, the pushing forces of the driving-side connector and the driven-side connector are switched in accordance with whether a driver is aboard.

14. The transmission control device according to claim 13, wherein when the switching between the forward control and the reverse control is performed a plurality of times during a route from a current position of the vehicle to a target position, the intermediate state is switched, after last switching, to another state.

15. The transmission control device according to claim 13, wherein the previously-generated control content automatically guides the vehicle to a target parking position.

16. The transmission control device according to claim 13, wherein the previously-generated control content automatically guides the vehicle from a parking position to a target non-parking position.

17. The transmission control device according to claim 13, wherein the intermediate state is changed in accordance with an oil temperature.

18. The transmission control device according to claim 13, wherein the intermediate state is changed in accordance with a drive force input to the driving-side connector.

19. The transmission control device according to claim 13, wherein the intermediate state is changed in accordance with a flow rate of lubricating oil supplied to the driving-side connector and the driven-side connector.

20. The transmission control device according to claim 13, wherein in the intermediate state, an intermediate state of a power transmission mechanism is set to be closer to a contact state side as compared to an intermediate state of a power transmission mechanism being held in the intermediate state.

* * * * *